US009501940B2

(12) United States Patent
Moumneh

(10) Patent No.: US 9,501,940 B2
(45) Date of Patent: Nov. 22, 2016

(54) SYSTEM AND APPARATUS FOR FINANCIAL EDUCATION, ENTREPRENEURSHIP EDUCATION AND LIFE MANAGEMENT

(71) Applicant: Kamal Moumneh, Lebanon (LB)

(72) Inventor: Kamal Moumneh, Lebanon (LB)

( * ) Notice: Subject to any disclaimer, the term of this patent is extended or adjusted under 35 U.S.C. 154(b) by 173 days.

(21) Appl. No.: 13/942,142

(22) Filed: Jul. 15, 2013

(65) Prior Publication Data

US 2015/0017611 A1 Jan. 15, 2015

(51) Int. Cl.
*G09B 19/18* (2006.01)
*G09B 5/00* (2006.01)

(52) U.S. Cl.
CPC .............. *G09B 5/00* (2013.01); *G09B 19/18* (2013.01)

(58) Field of Classification Search
CPC ...................................... G09B 19/18
USPC ........................................ 434/107
See application file for complete search history.

(56) References Cited

U.S. PATENT DOCUMENTS

| 5,055,079 | A | | 10/1991 | Hobson et al. | |
|---|---|---|---|---|---|
| 5,716,211 | A | * | 2/1998 | Vetter | 434/107 |
| 7,387,237 | B2 | | 6/2008 | Main | |
| 8,075,362 | B2 | | 12/2011 | Hardin et al. | |
| 2003/0212636 | A1 | * | 11/2003 | Resnick | 705/42 |
| 2006/0155617 | A1 | * | 7/2006 | Dasilva | 705/30 |
| 2008/0293019 | A1 | * | 11/2008 | Dooley et al. | 434/107 |
| 2009/0149106 | A1 | * | 6/2009 | D'Alleva et al. | 446/8 |
| 2009/0176432 | A1 | * | 7/2009 | Hardin et al. | 446/8 |
| 2013/0183892 | A1 | * | 7/2013 | Pierce | 453/3 |
| 2014/0040157 | A1 | * | 2/2014 | Cohen | G06Q 40/06 705/329 |

* cited by examiner

*Primary Examiner* — Robert J Utama
*Assistant Examiner* — Thomas Hong
(74) *Attorney, Agent, or Firm* — Maier & Maier, PLLC

(57) ABSTRACT

An apparatus for financial education, entrepreneurship education and life management. The apparatus can include a housing, at least one storage compartment received within the housing and including an interior cavity, a coin acceptor assembly adapted to receive a coin, determine the denomination of the coin, and deposit the coin into the storage compartment, electronic circuitry communicatively coupled to the coin acceptor assembly, a display device communicatively coupled to the electronic circuitry, at least one input device communicatively coupled to the electronic circuitry, wherein the electronic circuitry includes at least one non-transitory computer-readable medium storing executable instructions and a processor adapted to execute the instructions, wherein the instructions are adapted to display a graphic interface on the display device, and to receive input from a user via the at least one input device, so as to allow the user to manage a user account, the user account including a monetary balance.

16 Claims, 27 Drawing Sheets

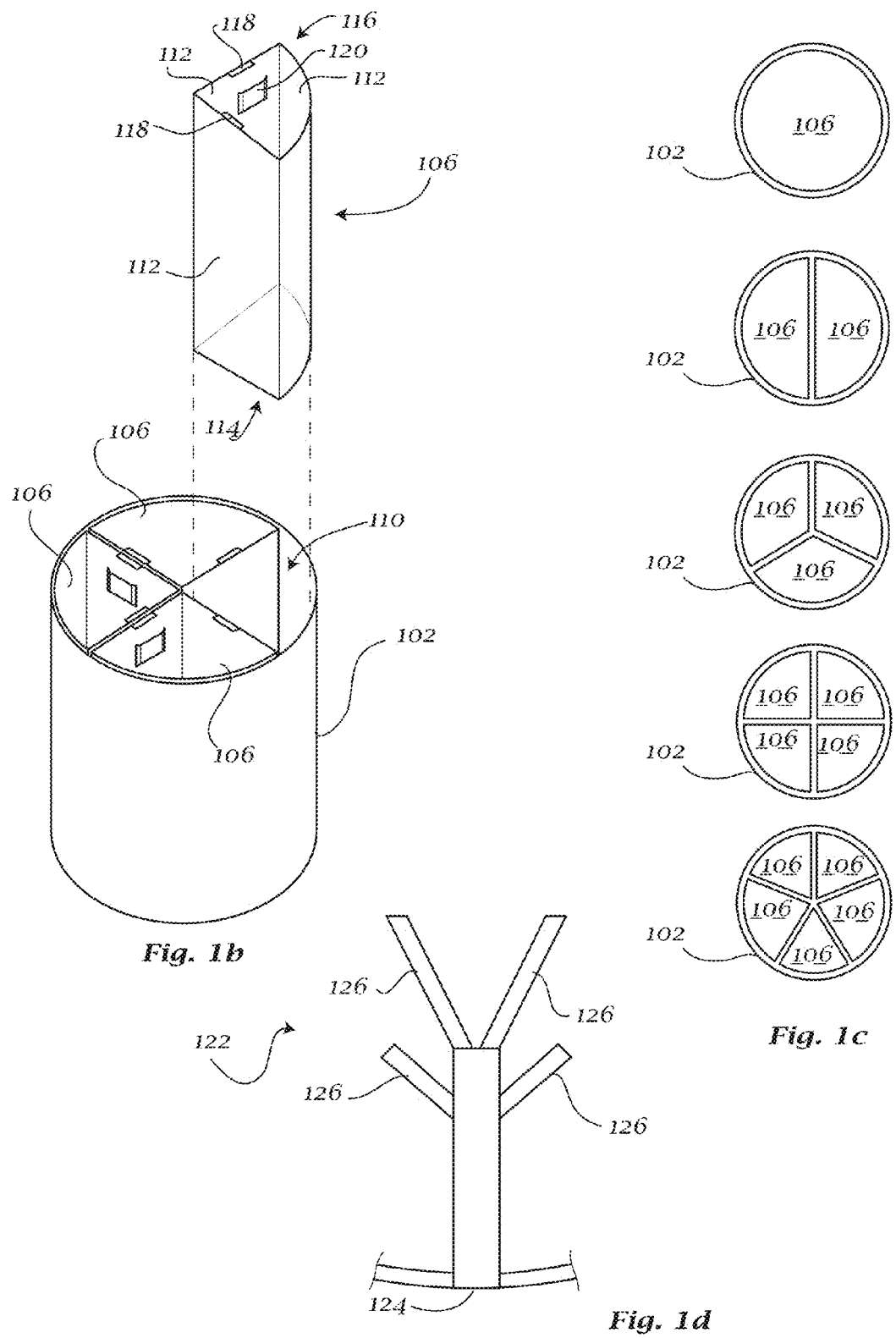

Users  Administrators  Operations  Personalization  Utilities  Security  Mobile  Software  Hardware  Help

Good Afternoon Julie
These are your Life Points Rewardable actions

| Date | Rewarder | Rewardable Action | By | New | Life Points Reward | Completed |
|---|---|---|---|---|---|---|
| 12/12/2012 | Mom | Read half hour on My Financial News | January 1, 2013 | Y | 15 | |
| 12/12/2012 | Mom | Deposit $35 | January 1, 2013 | Y | 10 | |
| 12/11/2012 | Mom | Reach any savings goal | January 1, 2013 | Y | 15 | |
| 12/11/2012 | Mom | Sell or barter two things on the exchange | January 1, 2013 | Y | 20 | |
| 11/1/2012 | Mom | Create crowdfunding campaign | December 1, 2013 | | 25 | Y |
| 11/1/2012 | Mom | Earn $20 on any job | December 1, 2013 | | 15 | Y |
| 10/1/2012 | Mom | Play 1 hour on any financial brain teaser game | November 10, 2013 | | 10 | Y |
| 10/2/2012 | Mom | Demo trade stocks for 2 hours | | | 25 | Y |
| 9/26/2012 | Mom | Save $5 for charity donations | October 20, 2013 | | 30 | Y |

Back To My Life Points     Next Life Points     Home

DIS $54.23  ●  2 New Chores  ●  ABC Retailer Accepted Offer  ●  NKE $55.70  ●  Total Balance $358.25  ●  3 New Jobs  ●  ABC Retailer Counter Offer  ●  $57.25 - Bike

*Fig. 8*

SYSTEM AND APPARATUS FOR FINANCIAL EDUCATION, ENTREPRENEURSHIP EDUCATION AND LIFE MANAGEMENT

BACKGROUND

Having a well-developed sense of fiscal responsibility and financial literacy is crucial to life in a market-based economy. Individuals who develop positive financial habits are better equipped to make choices that lead to an improved financial situation. Such choices can include smart spending, savings, investment, avoiding debt, and so forth.

Even though an early start to developing financial literacy is crucial for developing good financial habits, financial literacy is rarely taught in the educational system. Parents who wish to teach financial literacy to their children typically have to develop their own plans and find educational material that is age-appropriate for the children. Additionally, it may be difficult to present such subjects to younger children, who may not find the subject matter entertaining.

Furthermore, nurturing tomorrow's leaders is an essential tool to help grow good local jobs and diversify local economies, making them more resilient in the face of change. Entrepreneurship skills are essential in the 21st century because they are not only required to develop future entrepreneurs but are also beneficial for existing jobs that require employees to be entrepreneurial as well. While the key concepts of entrepreneurship and business can be taught at any time during a person's life, the attitudes and values associated with becoming a successful entrepreneur are more likely to develop if they are explored and nurtured at a young age. Therefore, children are more likely to develop skills that can help them thrive and succeed in life both professionally as well as personally if they are exposed to entrepreneurship and an entrepreneurial business environment at a young age.

Additionally, the $21^{st}$ century is marked by ever increasing complexities and challenges that requires children to manage their lives in a responsible, organized and efficient way. Children also live in an era of technology driven environments, where there is an overflow of information that often requires rapid adjustments to life's responsibilities. It is therefore crucial for today's children to develop good core life managerial and organizational skills at a young age so as to prepare them to lead successful and prosperous lives as adults.

A way to provide age-appropriate financial, business, and entrepreneurship education to children of various ages in an entertaining and life-applicable manner is therefore desired. A way to provide age-appropriate life management tools and systems to children of various ages in an entertaining and life-applicable manner is also desired.

SUMMARY

According to at least one exemplary embodiment, an apparatus for financial education, entrepreneurship education and life management is disclosed. The apparatus can include a housing, at least one storage compartment received within the housing and including an interior cavity, a coin acceptor assembly adapted to receive a coin, determine the denomination of the coin, and deposit the coin into the storage compartment, electronic circuitry communicatively coupled to the coin acceptor assembly, a display device communicatively coupled to the electronic circuitry, at least one input device communicatively coupled to the electronic circuitry, wherein the electronic circuitry includes at least one non-transitory computer-readable medium storing executable instructions and a processor adapted to execute the instructions, wherein the instructions are adapted to display a graphic interface on the display device, and to receive input from a user via the at least one input device, so as to allow the user to manage a user account, the user account including a monetary balance.

BRIEF DESCRIPTION OF THE FIGURES

Advantages of embodiments of the present invention will be apparent from the following detailed description of the exemplary embodiments. The following detailed description should be considered in conjunction with the accompanying figures in which:

FIG. 1b is a view of a housing for an exemplary embodiment of an apparatus for financial education, entrepreneurship education and life management.

FIG. 1c shows various configurations of compartments of the housing.

FIG. 1d shows a coin acceptor assembly for an exemplary embodiment of an apparatus for financial education, entrepreneurship education and life management.

FIGS. 4-8 show exemplary interfaces for software for an apparatus for financial education, entrepreneurship education and life management.

DETAILED DESCRIPTION

Figure 1A:
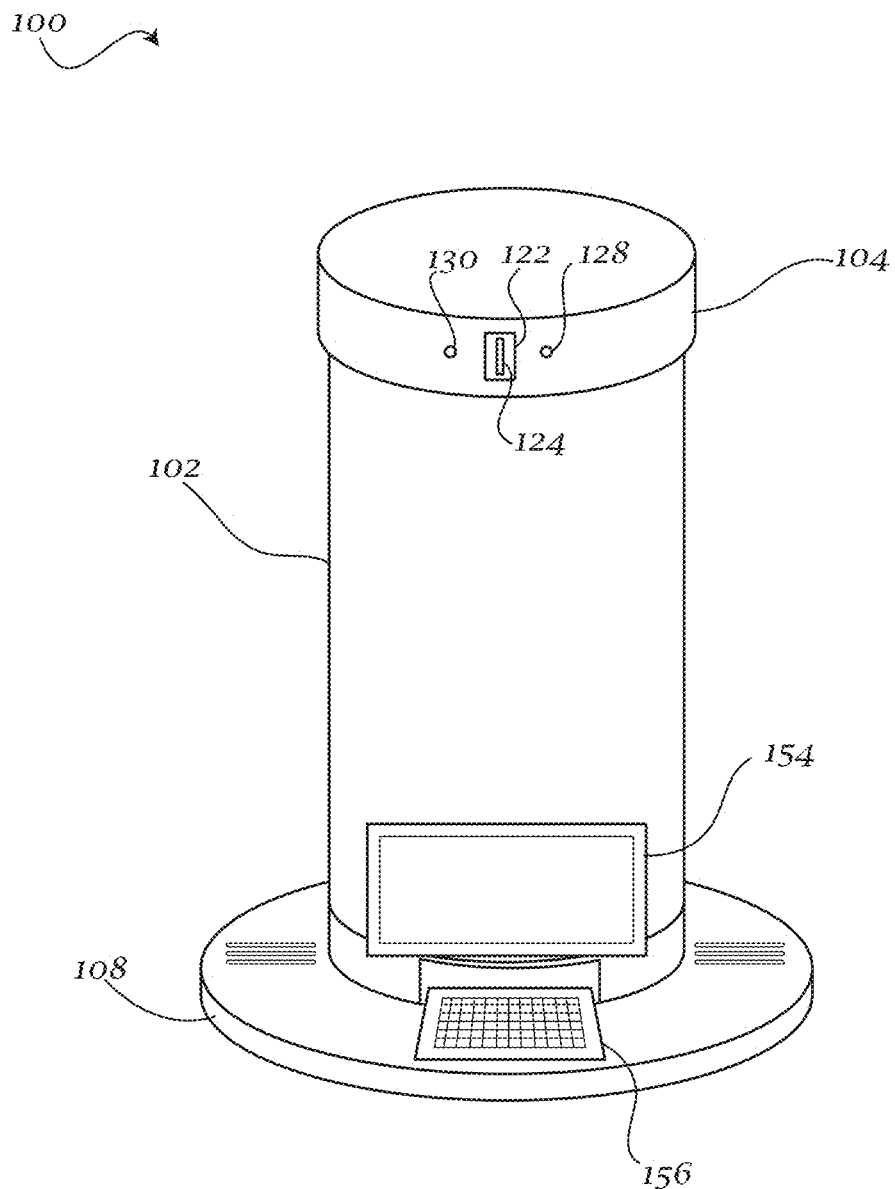
FIG. 1a is a front view of an exemplary embodiment of an apparatus for financial education, entrepreneurship education and life management.
Figure 1E:
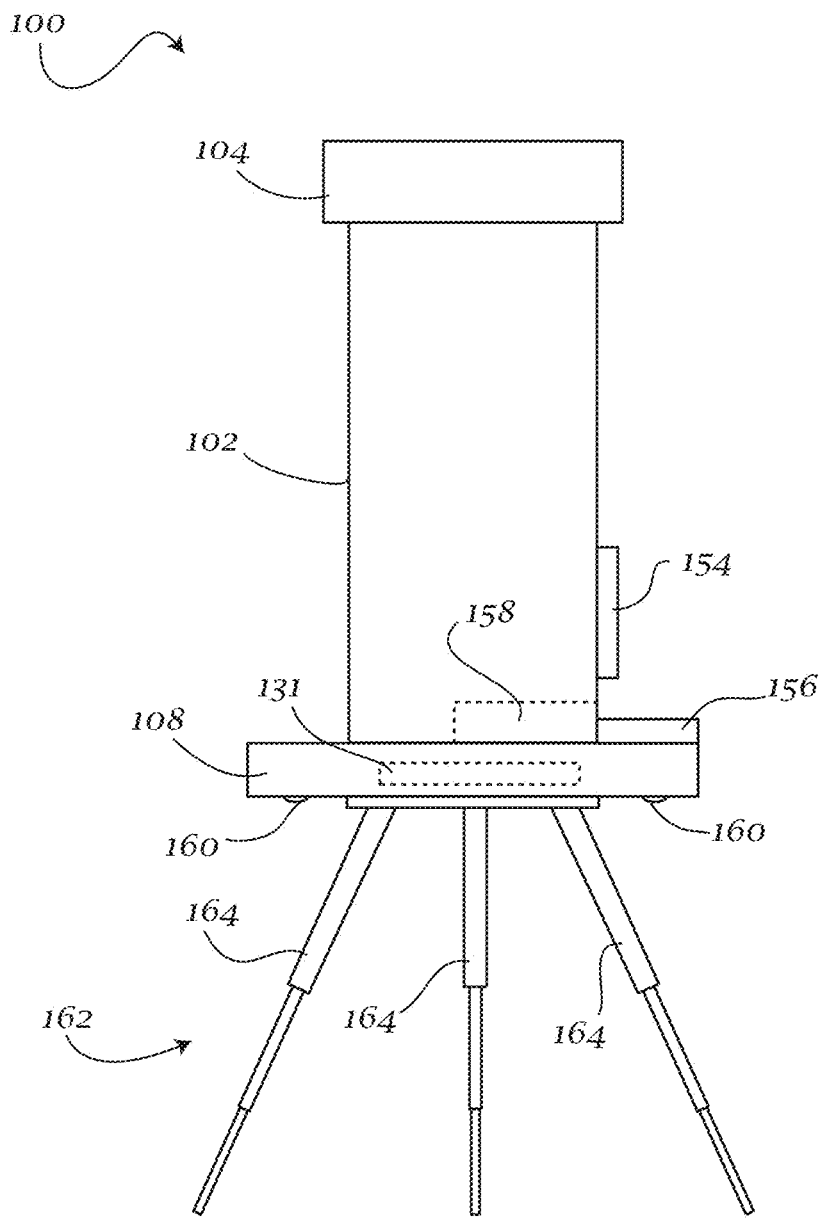
FIG. 1e is a side view for an exemplary embodiment of an apparatus for financial education, entrepreneurship education and life management.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

Referring to FIGS. 1a-1f, and according to at least one exemplary embodiment, a financial education, entrepreneurship education and life management apparatus 100 is disclosed. The financial education, entrepreneurship education and life management apparatus 100 can include a housing 102, coverable by a cap 104 and including at least one storage compartment 106. The housing 102 may be coupleable to a base 108, which can contain a plurality of electronic components for the operation of apparatus 100. The base 108 can be adapted to be placed on a tabletop or similar surface, or to be coupled to a plurality of legs so as to allow apparatus 100 to be elevated above a floor or a similar surface.

Housing 102 can enclose a cavity 110 into which a plurality of storage compartments 106 may be placed. In an exemplary embodiment, the number of storage compartments 106 that may be disposed inside housing 102 may range from one to five compartments. Furthermore, in the exemplary embodiment, housing 102 may have a cylindrical shape. Accordingly, each storage compartment 106 may be shaped as a sector of the cylinder, such that the fraction of housing 102 occupied by each compartment 106 is the inverse of the number of compartments 106 disposed within housing 102. FIG. 1c shows top plan views of the various configurations of compartments 106 within housing 102. The amount of compartments 106 can be varied according to the amount of users registered with a particular apparatus 100. Thus, in the exemplary embodiment, apparatus 100 may accommodate between one and five registered users.

Each compartment 106 can include a plurality of side walls 112, a closed bottom end 114, and an open top end 116. Each compartment 106 may further include at least one lip 118 disposed at the open top end 116 thereof. The lip 118 may be coupled to a side wall 112 and project horizontally therefrom into the interior of the compartment 106. The lip can facilitate the removal of compartment 106 from cavity 110, for example by allowing the user to place their finger or hand under the lip 118 and lift the compartment out of housing 102.

Each compartment 106 may be used to store currency therein, for example coin currency. Each compartment 106 may further include at least one pocket 120, which may be coupled to a side wall 112 on the interior side thereof and proximate the top end 116 of compartment 106. Pocket 120 may be adapted to store paper currency, as well as other paper-based instruments such as checks, IOU notes, and the like.

Housing 102 and compartments 106 may be made from any desired material. In one exemplary embodiment, housing 102 and compartments 106 may be made from a translucent plastic, allowing users of apparatus 100 to view the contents of compartments 106. Compartments 106 may be made from a colored translucent plastic, with each compartment 106 being used with apparatus 100 having a different color, thereby enabling each user to easily identify their particular compartment and to view the contents thereof.

A cap 104 may be removably coupled to housing 102 in any desired manner, for example by threaded engagement, friction fit, or the like. In some exemplary embodiments, the cap 104 may be swivelably coupled to housing 102 via a swivel-hinge assembly coupled to the upper edge of housing 102 and the lower edge of cap 104. The cap 104 may be swiveled to the side of housing 102, or may be otherwise removed, so as to expose the interior cavity 110 and to allow access to storage compartments 106, thereby allowing the user to place or withdraw currency or other financial instruments to or from the compartments.

Additionally, cap 104 can include a coin acceptor assembly 122. The coin acceptor assembly 122 may be mounted in a housing which may be coupled to cap 104 and disposed in the interior of cap 104. Coin acceptor assembly 122 can include a coin slot 124, accessible from the exterior of cap 104, and a plurality of coin distribution channels 126, as shown in FIG. 1d. Each coin distribution channel 126 can correspond to a particular compartment 106. The coin acceptor assembly can further be adapted to identify the denominations and quantities of the coin currency deposited therein. The coin acceptor assembly may be any coin acceptor assembly known in the art that enables apparatus 100 to function as described herein. Furthermore, the coin acceptor assembly may be adapted to direct a coin from slot 124 to a selected coin distribution channel of the plurality of coin distribution channels 126. This may be accomplished by flaps, baffles, pins, or any structures known in the art that enable apparatus 100 to function as described herein.

Cap 104 can further include a camera 128 and a motion sensor 130. Both camera 128 and motion sensor 130 can be positioned such that they face a user of apparatus 100 when cap 104 is in a closed configuration. Camera 128 and motion sensor 130 may further have a wide angle viewing or detection range. The camera 128 and motion sensor 130 may be provided using any known components that enable apparatus 100 to function as described herein.

In some exemplary embodiments, housing 102 may be shaped as a triangular prism. In such an embodiment, housing 102 may include three compartments 106, while cap 104 may include three coin acceptor assemblies 122. Each coin acceptor assembly 122 can correspond to a particular compartment 106, and can include a coin slot 124 and a single coin channel 126. In further exemplary embodiments, housing 102 may be provided in any desired shape that enables apparatus 100 to function as described herein.

Detachably coupled to the lower end of housing 102 may be a base 108. The detachable coupling between housing 102 and base 108 may be effected in any known manner. Disposed on a bottom surface of base 108 may be a plurality of footpads 160, which may facilitate supporting apparatus 100 on a surface such as a table or desk top. Footpads 160 may be formed from any suitable material such as rubber. A stand 162 may further be detachably coupleable to a bottom surface of base 108. Stand 162 may include a plurality of telescoping legs 164, and can facilitate supporting apparatus 100 on a surface such as a floor, as well as positioning apparatus 100 at a desired height above the surface.

Figure 1F:
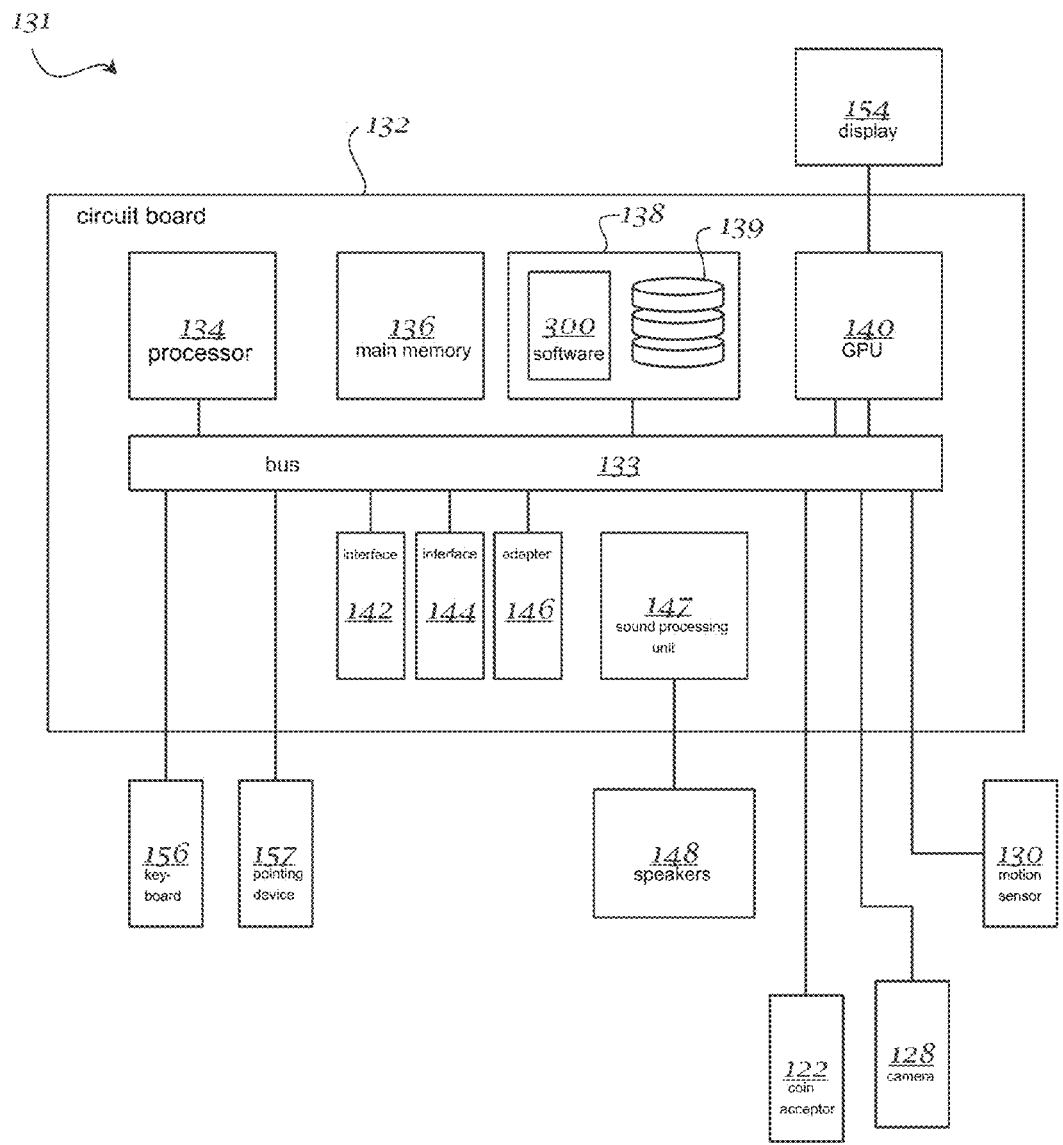
FIG. 1f is a diagram showing the electrical components of an exemplary embodiment of an apparatus for financial education, entrepreneurship education and life management.

Disposed within base 108 can be the electronic circuitry and hardware components 131 of apparatus 100, including a circuit board 132, and a bus 133 or other communicating mechanism for communicating information, as shown in FIG. 1f. The printed circuit board 132 may be used to mechanically support and electrically connect the electronic hardware components of apparatus 100, and may be secured to base 108 by a fastener or an adhesive. Communicatively coupled to circuit board 132 and bus 133 may be a processor 134 for processing information, main memory 136 such as random access memory or other dynamic storage device coupled to the bus for storing information, at least one non-transitory computer readable storage medium 138 which may be one or more of a hard drive, a flash-based drive, and read only memory. The storage medium 138 may store software 300 for executing the various processes of apparatus 100, as well as at least one database 139 containing user data and multimedia data for use with software 300.

Communicatively coupled to circuit board 132 may further be a display controller and graphics processing unit 140 such as a video card, at least one wired communications interface 142 such as an Ethernet port, at least one wireless communication interface 144, for example an 802.11 communications interface, a Bluetooth communications interface, or the like. Interfaces 142 and 144 may be used to connect apparatus 100 to a local-area network, to another computing device, or to the Internet. Furthermore, base 108 can include at least one communication adapter 146, which may be one or more of a USB adapter, Lightning adapter, a serial or parallel adapter or any other known communications adapter that may be used to connect apparatus 100 to other computing devices.

A sound processing unit 147 may be communicatively coupled to circuit board 132 and to speakers 148 disposed within base 108. Speakers 148 may emit audio via apertures provided in base 108. For example, micro-apertures may be provided in the upper surface of base 108. Additionally, a microphone 149 may be communicatively coupled to circuit board 132 and may be disposed on base 108 in a location facing the user.

A heat sink and cooling fan may further be disposed within base 108 so as to provide cooling to the hardware components 131 of apparatus 100. A plurality of apertures, such as microapertures, slits, or other any other openings may be provided in the enclosure of base 108, for example on the sides of base 108, so as to allow heat exchange between the hardware components 131 and the external environment.

Graphics processing unit 140 may be communicatively coupled to display 154 which may be disposed above and coupled to base 108 and positioned facing a user of apparatus 100. Display 154 may be, for example, a thin-profile display such as an LCD or an OLED display. Display 154 may further be a touch-screen display. Base 108 can further include a keyboard 156 and a pointing device 157 such as a mouse, trackball, or trackpad. Keyboard 156 may be positioned facing the user and below display 154. Keyboard 156 may further be retractable into a cavity 158 defined within base 108 for receiving the keyboard.

The camera 128, motion sensor 130, and coin acceptor assembly 122 can also be communicatively coupled to circuit board 134. The coin acceptor assembly 122 can be in communication with software 300. For example, the coin acceptor assembly may be controlled by processor 134 and software 300 so as to direct the deposited coins into a particular coin distribution channel 126. Furthermore, the coin acceptor assembly 122 may communicate to software 300 the denominations and quantities of the coins deposited via the coin acceptor assembly.

Figure 2:
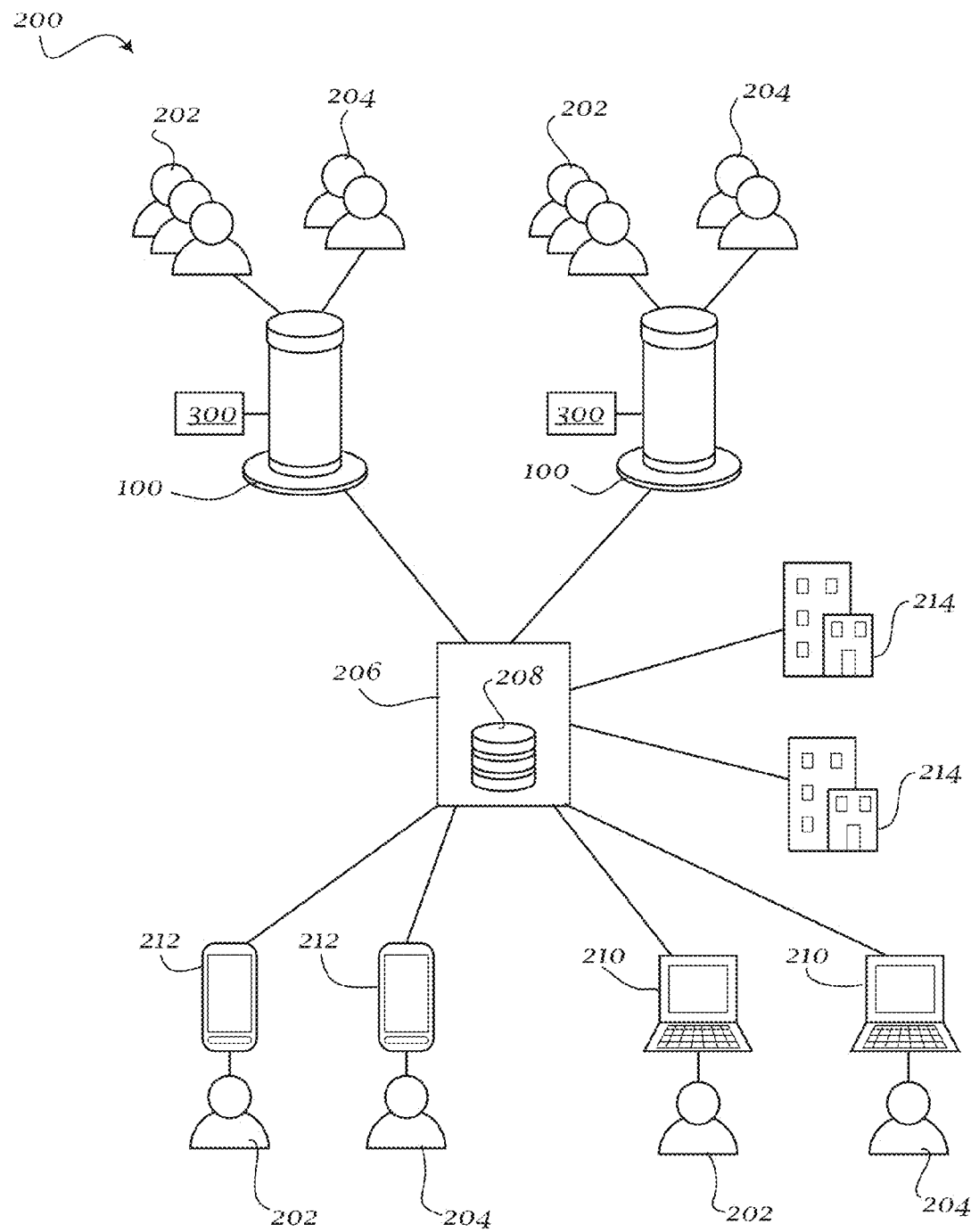
FIG. 2 shows an exemplary system for financial education, entrepreneurship education and life management.

FIG. 2 shows an exemplary embodiment of a financial education, entrepreneurship education and life management system 200. The financial education, entrepreneurship education and life management system can include financial management education apparatus 100. Communicatively coupled to apparatus 100 may be software 300, which can be adapted to manage the hardware resources of apparatus 100. Software 300 can further include a graphical user interface and various programs and utility applications that allow a user to interact with software 300 and to utilize the functionality of apparatus 100.

The financial education, entrepreneurship education and life management system 200 can include a plurality of accounts that are associated with a particular financial management education apparatus 100. Such accounts can include user accounts 202 and administrator accounts 204. A user account 202 can be created for each user of apparatus 100 and associated with a specific container 106 of apparatus 100. Administrator accounts 204 can be created for any desired administrator of a particular apparatus 100, such as parents, guardians, and other household adults. The administrator accounts can have greater permissions than, and diverse functionality from user accounts 202, as described further below. The administrator accounts can further define access rights and privileges for user accounts on a common apparatus 100, as well as provide incentives for the user accounts to perform desired activities on apparatus 100 and software 300, as described further below. Both user accounts 202 and administrator accounts 204 can log into software 300 via the interfaces thereof. Data related to user accounts 202 and administrator accounts 204 may be stored on database 139 of apparatus 100.

Financial education, entrepreneurship education and life management system 200 can further include at least one server 206. Server 206 may be communicatively coupled to software 300 of apparatus 100 via a wide-area network such as the internet. Server 206 may include a non-transitory computer-readable medium on which at least one database 208 may be stored. Each apparatus 100 may be registered with server 206 and data related thereto may be stored or mirrored on database 208. Additionally, data related to user accounts 202 and administrator accounts 204 associated with each registered apparatus 100 may also be stored or mirrored on database 208.

Both users 202 and administrators 206 can log into server 206 so as to access their accounts and the data related thereto, as well as to manage aspects and configurations of apparatus 100. Logging into server 206 may be accomplished directly via apparatus 100 and software 300, or remotely without utilizing apparatus 100. Remote login may be accomplished, for example, via a web interface that may be accessed by any computing device 210, or via a custom application for a mobile device 212. Thus, server 206 can offer a cloud-based storage system for data relating to each apparatus 100 and its accounts, and data may be synced between the apparatus 100, server 206, web interface for a computing device 210, and application for a mobile device 212.

System 200 can further allow for registration of multiple affiliates 214. The affiliates 214 may provide desired goods, services and information to users and administrators of apparatus 100. Such affiliate accounts can include, for example, financial institutions such as commercial banks, investment brokerage firms, retail establishments, prospective employers, advisors, consultants and educational institutions, and so forth. The users 202 and administrators 204 of each apparatus 100 can communicate with affiliates 214 via corresponding utility applications 314 provided as part of software 300 of apparatus 100, via the web interface for computing devices 210, and via the application for mobile devices 212.

Figure 3:
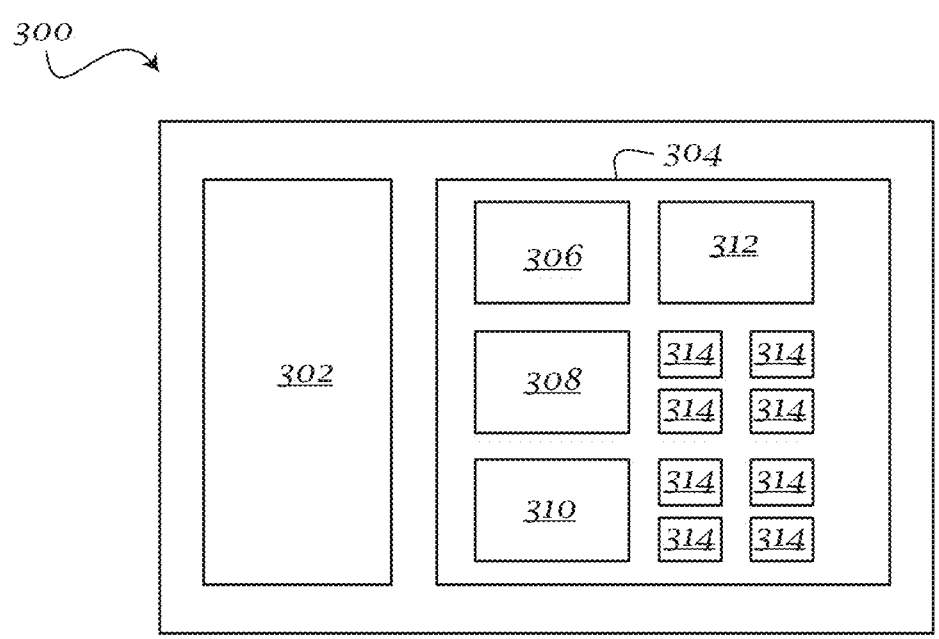
FIG. 3 is a diagram showing exemplary software for an apparatus for financial education, entrepreneurship education and life management.

FIG. 3 shows an exemplary diagram of software 300 for a financial management education, entrepreneurship education and life management apparatus 100. An operating system 302 which can manage the hardware resources of the apparatus 100 and can provide common services for various software programs 304. The operating system 302 can act as an intermediary between the software applications and the hardware components of apparatus 100, and can manage inputs, outputs and memory allocation. Additionally, the operating system 302 can include a graphic user interface which can be displayed on display device 154.

Software 300 can include a plurality of software programs 304. Programs 304 can include facial recognition software 306, currency recognition software 308, cartoonization software 310, and interactive voice command software 312. Programs 304 can further include a plurality of utility applications 314. The utility applications 314 can allow for user interaction with various financial management, entrepreneurship and life management features and other related features provided by apparatus 100. The applications 314 can include Deposit, Withdraw, My Account, My Banking, My Investments, My Shopping, My Chores, My Jobs, My Barter & Sales Exchange, My Financial Planner, My Business World, My Crowdfunding, My Homework, My Life Points, My Websites, My Life Boards, My Games, My Private Advisor, My financial Resources, My Message Board, My Chat Room, My Money Facts, Life Share and the Life Hub News & Press.

Software 300 can also facilitate the interoperability and interactivity of the money management and accounting systems as well as computations and visual graphic illustrations. Software 300 can also facilitate interactivity and connectivity with affiliates such as retailers, prospective employers, educators, educational institutions, banking and investment brokerage firms, and other third parties, affiliates and partners. Software 300 can further facilitate a variety of entertaining and engaging audio and visual programing features on a variety of screens through the utility applications, including but not limited to, welcome greetings on accessed screens, salutations on accessed screens, achieved savings goals, product and service information, date and time stamp on screens and variety of queries and information on accessed screens.

In some exemplary embodiments, facial recognition software 306 can utilize camera 128 so as to provide functions and features that allow apparatus 100 to interact with the user. For example, if a user is positioned facing camera 128, facial recognition software 306 can recognize the user's facial features and direct software 300 to display an interface for the particular user's account, for example the user's home screen. A user can register their facial features or image with software 300, for example during a set up phase or a later stage by accessing the appropriate menus via the graphic user interface for software 300.

In some exemplary embodiments, facial recognition software 306 can facilitate directing coin acceptor assembly 122 to pivot or switch to an orientation that allows coins deposited through slot 124 to be directed to the coin distribution channel 126 that corresponds to the user's particular compartment 106.

Additionally, in some exemplary embodiments, facial recognition software 306 can recognize a user and can facilitate directing software 300 to display audio and visual content that is customized for the user based on the user's preferences, age, and any other desired criteria. The audio and visual content can include, for example, audio and visual welcome greetings, animations, and video sequences that welcome the user or provide entertaining, educational, or otherwise relevant information to the user.

In some exemplary embodiments, currency recognition software 308, can utilize camera 128 so as to allow the user to deposit paper currency into their account without manual value entry of the paper currency. For example, a user may hold a paper currency note in front of camera 128 for a specified period of time, allowing currency recognition software 308 to process image data from camera 128 and to identify the denomination of the paper currency note. Software 300 can then credit the user's account with the monetary value of the paper currency. Subsequently, audio and visual prompts or instructions can be emitted from the speakers 148 and/or displayed on display 154, instructing the user to remove the cap 104 and deposit the paper currency in the user's particular compartment 106.

In some exemplary embodiments, image cartoonization software 310 can allow a user to convert their photographic images into digital cartoonized images, thereby creating self-images of the user. Such images may be used as a profile picture of the user, may be incorporated into story lines and scenes in graphic or video sequences displayed by software 300. A plurality of cartoonized images may be associated with a user and may be stored in an image library managed by the user.

In some exemplary embodiments, interactive voice command software 312, can allow the user to interact with software 300 via voice commands instead of physical data input devices.

Turning to FIGS. 4-6c, exemplary interfaces of software 300 as well as the various software applications 314 for interacting with apparatus 100 are disclosed. Software 300 can include a graphic user interface (GUI) that can allow users and administrators to operate and interact with apparatus 100 and applications 314 by touching or clicking various widgets such as tiles, buttons, icons, boxes, entry boxes and pop up dialog windows. Users and administrators can interact with the interfaces of software 300 via input devices such as a keyboard, mouse, or trackpad, or via a touch-screen display.

Users and administrators can log into their respective accounts via a login screen, displayed, for example, at startup or after logout. The login screen can display all user accounts registered with software 300, for example, as colored image boxes on the login screen. The colored image boxes may be customized and personalized as desired by the user or administrator. Users may log in to software 300 by selecting a corresponding box and entering a password. A separate administrator tile can allow administrators to log into software 300 by entering the administrator username and password.

Figure 4:
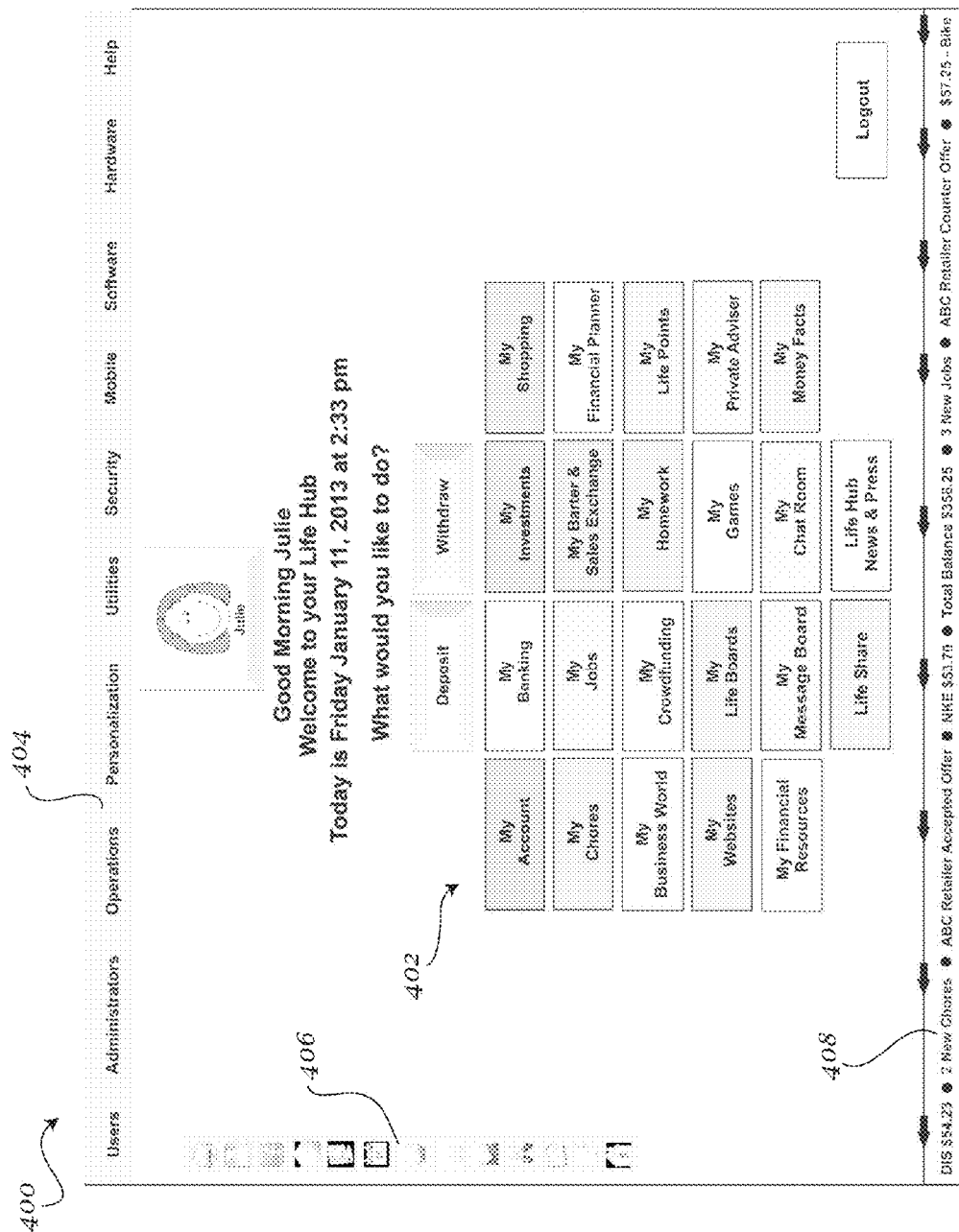

FIG. 4 shows an exemplary main menu interface 400 for software 300. Main menu interface 400 can be provided to a user of apparatus 100 and can include a plurality of tiles 402 that the user can select to access corresponding software applications 314. Such tiles can include, for example, Deposit, Withdraw, My Account, My Banking, My Investments, My shopping, My Chores, My Jobs, My Barter & Sale Exchange, My Financial Planner, My Business World, My Crowdfunding, My Homework, My Life Points, My Website, My Life Boards, My Games, My Private Advisor, My Financial Resources, My Message Board, My Chat Room, My Money Facts, Life Share and Life Hub News & Press.

The GUI of software 300 can also include a menu bar 404, a tool box 406 and a real-time live streamer 408. Elements 404, 406, 408 may be displayed throughout the various interfaces of software 300, allowing the user convenient shortcuts to various features of the software.

The menu bar 404 can include navigational tools in the form of drop down menus that allow the user to access and manage a variety of software and utility features, functions, settings and instructional information. The menu bar can include a plurality of options including Users, Administrators, Operations, Personalization, Utilities, Security, Mobile, Software, Hardware and Help.

The Users menu can allow the user to access and manage a variety of features, functions and settings and information pertaining to users. The Users menu can include a plurality of options, including About Users, Profiles, Preferences, Personal Folder, Notifications & Alerts, Archives, Address Book and Access log. The Profiles menu option can also include a submenu with options relating to Hub Profiles, Barter & Sales Profile, Jobs Profile, Crowdfunding Profile, Shopper Profile, Messages Profile and Chat Room Profile.

The Administrators menu can allow an administrator to access and manage a variety of features, functions and settings and information pertaining to administrators.

The Administrators menu can include a plurality of menu options including About Administrators, Administrator Profile, Parental Controls, Notifications & Alerts, Life Points, Chores Scheduler, Private Advisor, Usage History, Mobile Settings and Master Access. The Parental Controls menu option can also include a submenu that includes Hub Restrictions, Web Restrictions and Monitoring. The Life Points menu option can also include a submenu that includes Schedule and Conversion Rate. The Master Access menu option can also include a submenu that includes Deposits, Withdrawals, User Accounts, Banking, Investments, Shopping, Chores, Jobs, Barter & Sales Exchange, Financial Planner, Business World, Crowdfunding, Homework, Life Points, Websites, Life Boards, Games, Private Advisor, Financial Resources, Message Board, Chat Room and Money Facts.

The Operations menu can allow the user to access and manage a variety of features, functions, settings and information pertaining to operations of apparatus 100. The Operations menu option can include a plurality of menus including About Operations, Money Chambers, Sleep Settings, Deposit Settings, Withdrawal Settings, Language Settings and Privacy Settings.

The Personalization menu can allow the user to access and manage a variety of features, functions, settings and information pertaining to personalization of a user's account. The Personalization menu can include a plurality of menu options pertaining to About Personalization, Personalization Settings, Photos, Cartoonization, Backgrounds, Text & Textures and Art & Image Library. The Photos menu option also incorporates a submenu that includes Hub Photos and Mobile Photos.

The Utilities menu can allow the user to access and manage a variety of features, functions, settings and information pertaining to the various utilities of software 300. The Utilities menu can include a plurality of options including About Utilities, Tool Box, Live Streamer Settings, Email Activation, Email Settings and Email Access. The Security menu can allow the user to access and manage a variety of features, functions, settings and information pertaining to security of the user's account.

The Security menu can allow the user to access and manage a variety of features, functions, and information pertaining to security features of software 300. The Security menu can include a plurality of options including About Security, User Password and Administrator Password. The Administrator Password menu option also incorporates a second tier drop down menu that includes Universal Access Password.

The Mobile menu can allow the user to access and manage a variety of features, functions, settings and information pertaining to applications for mobile devices 212, which can be used to access a user's account, for example on server 206. The Mobile menu can include a plurality of options including About Mobile, Mobile Activation, Mobile Notifications & Alerts and Mobile Downloads.

The Software menu can allow the user to access and manage a variety of features, functions, settings and information pertaining to the software 300 of apparatus 100. The Software menu can include a plurality of options including About Software, Content Registration, Content Downloads, Animations Registration, Animation Downloads, Facial Recognition, Currency Recognition, Interactive Voice Commands, Cartoonization Software and Software Updates.

The Hardware menu can allow the user to access and manage a variety of features, functions, settings and information pertaining to the hardware components of apparatus 100. The Hardware menu can include a plurality of options including About Camera & Motion, Camera Settings, Motion Sensor Settings, Internet Connectivity, Audio Controls and Visual Controls.

The Help menu can allow the user to access and manage a variety of features, functions, settings and information pertaining to software and hardware assistance, user help, instructional information and other information. The Help menu can include a plurality of options including About Life Hub, Getting Started Guide, Set Up Instructions, FAQ, Privacy Policy, Online Help and Technical Support.

Tool box 406 can include a plurality of widgets, which may also be accessible via keyboard hot keys, that provide the user with quick access to a variety of utility functions and features, including but limited to, printing, snipping, posting, calculating and accessing the Internet with a single touch or click command. The tool box 406 may be positioned in any desired area of the interface, and can include a plurality of tool icons including Print, Save to Folder, Post To Facebook, Email, Screen Shot, Calendar, Internet Browser, Calculator, Picture Camera, Snip Scissors, Post To Website, Notepad and Home. The user can activate and deactivate via the Tool Box menu option of the Utilities menu. The Print tool can allow the user to print any page displayed on the screen. The Save To Folder tool can allow the user to copy and save any page to the user's personal folder. The Post To Facebook tool can allow the user to copy and post the displayed screen to the user's Facebook page. The Email tool can allow the user to email as an attachment any page displayed on the screen. The Screen Shot tool can allow the user to capture a screen shot of web content on the screen display. Captured screen shot images can be emailed, posted to the user's Facebook page and saved into the user's personal folder. The Calendar tool can provide the user with a calendar that can used to set schedules and reminders. The Internet Browser tool can allow the user to access and display a web browser to access the Internet. The Calculator tool can allow the user to display a calculator on the GUI. The Picture Camera tool can allow the user to activate camera 128 so as to capture an image. The Snip Scissors tool can allow the user to snip and capture any portion of the screen including software interfaces and web content and instantly post to the user's Life Board. Snipped images can also be emailed, posted to the user's Facebook page and saved into the user's personal folder. The Post to Website tool can allow the user to instantly post any content on the GUI including Life Boards, images and money facts to the user's website. The Notepad tool can allow the user to access a notepad to create and save notes. The Home tool can allow the user to instantly revert to the Home screen.

The streamer 408 can present the user with a constantly updating stream of information, data, news, as well as notifications pertaining to the functionality, features and utilities of apparatus 100. The user can customize the streamer to stream and display any desired information, including but limited to, stock quotes, messages, money quote of day, business mantras, financial news briefs, new content notifications, new chores and job assignments, affiliated retailers' messages, money facts briefs, Barter & Sale Exchange notifications and savings balances and so forth. The streamer may be customized via the Streamer Settings and Live Streamer Settings options of the Utilities menu.

Figure 5A:
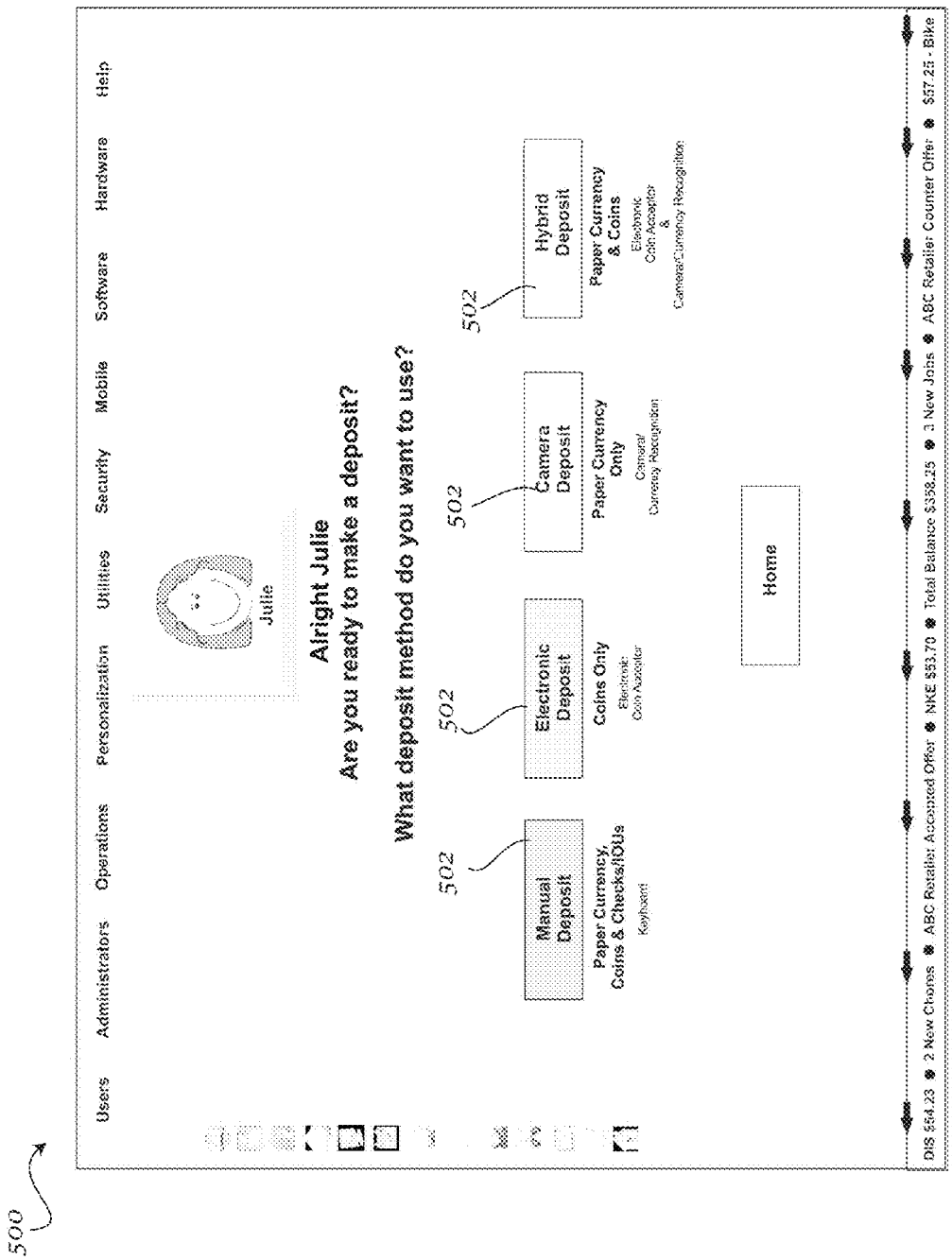
Figure 5B:
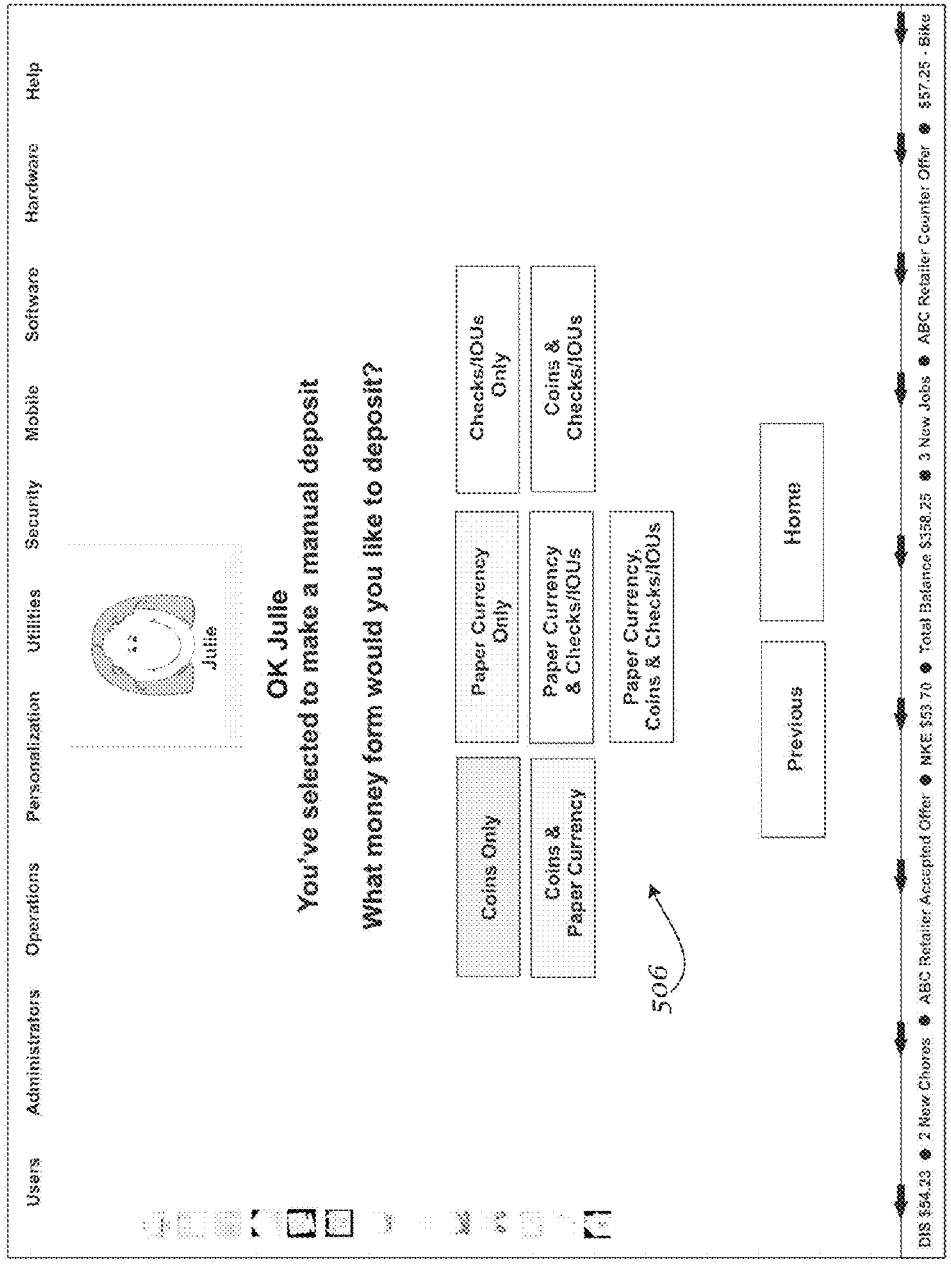
Figure 5C:
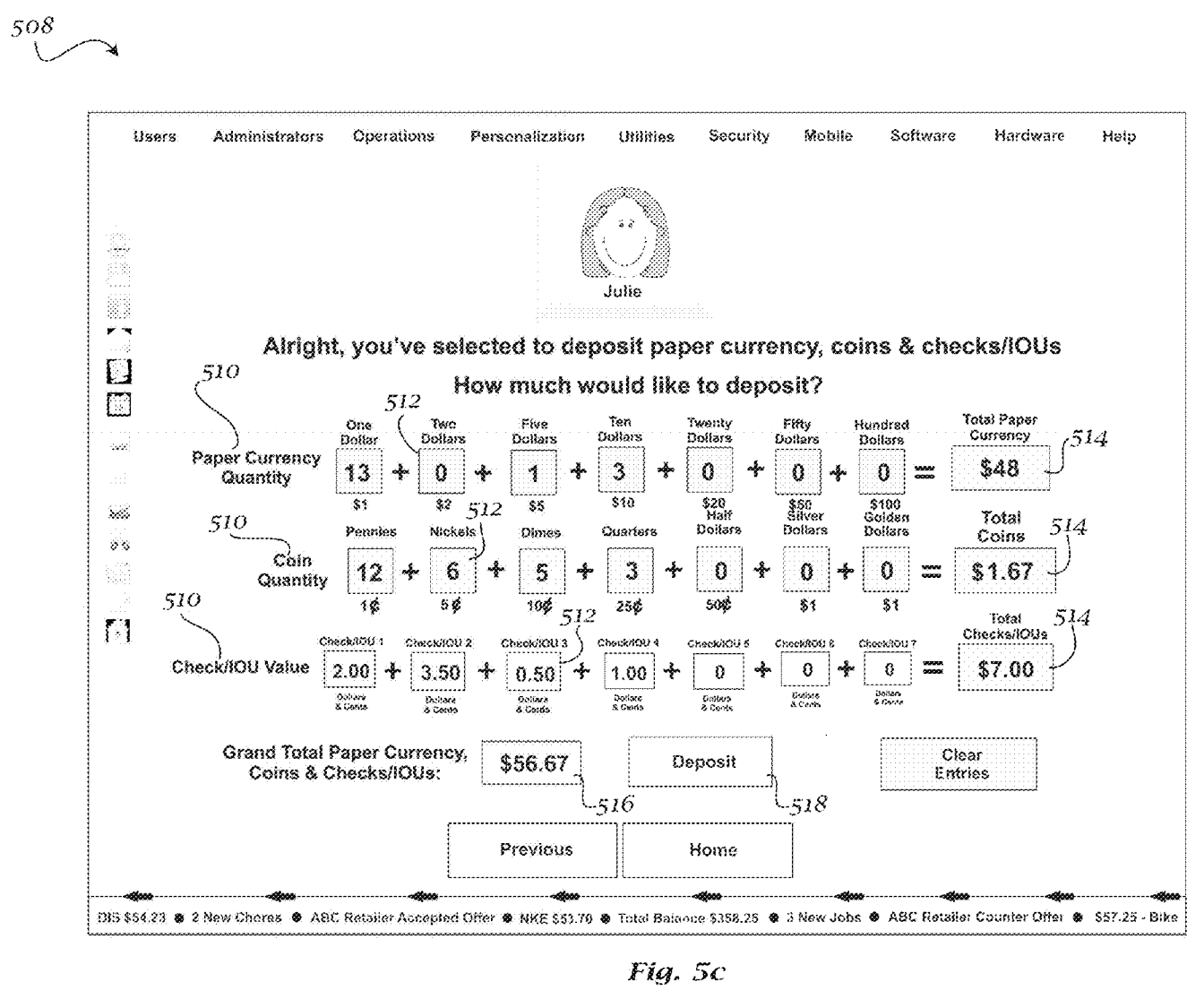
Figure 5D:
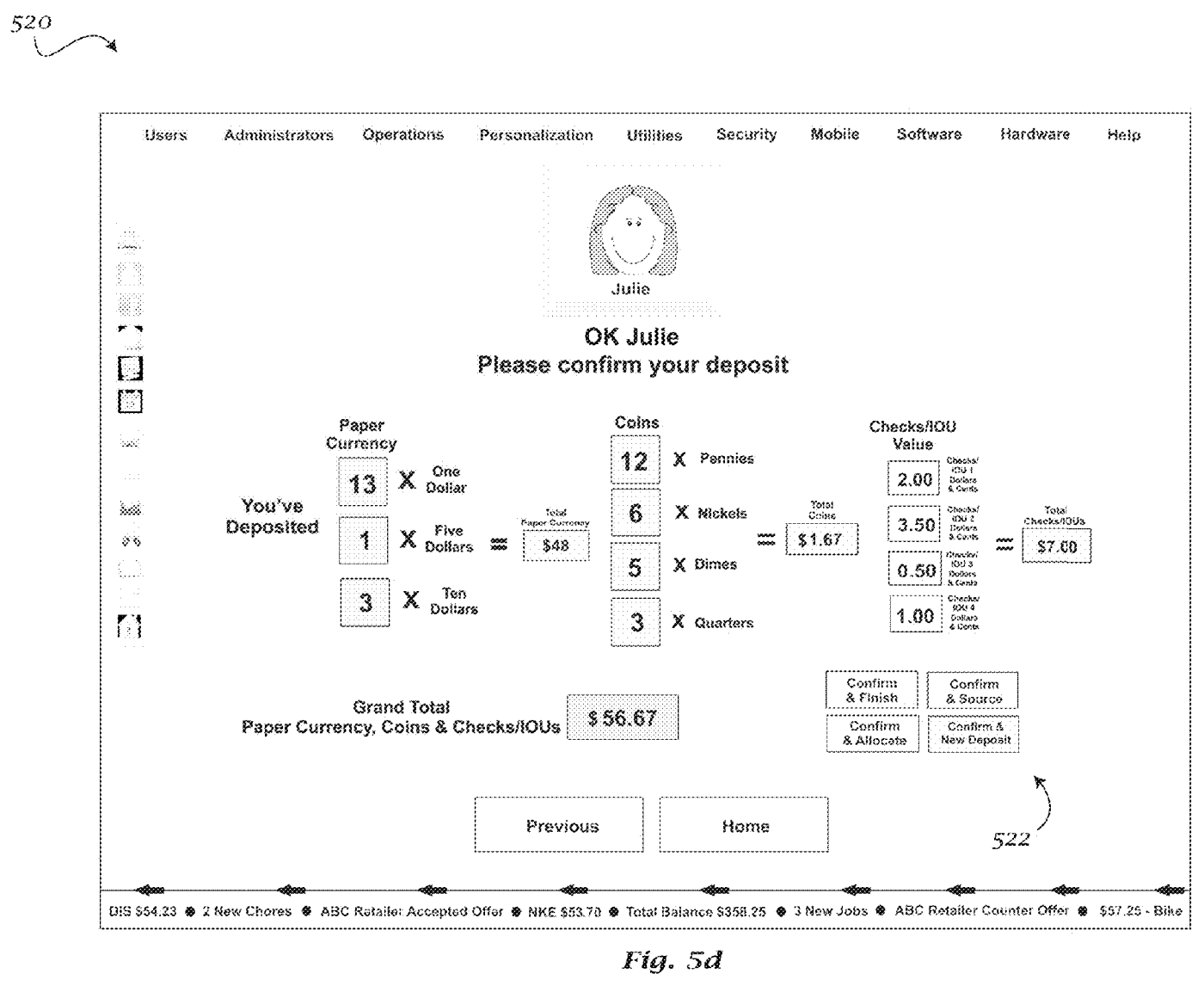

Turning to FIGS. 5a-5f, a user can deposit funds into their account with apparatus 100 by using the Deposit application. As shown in FIG. 5a, the main interface 500 of the Deposit application can include a plurality of deposit options 502. The deposit options 502 can allow the user to deposit funds in a variety of manners, including manual deposit, electronic deposit, camera deposit, and hybrid deposit.

The manual deposit option can allow the user to deposit funds simply by removing the cap 104 of housing 102, and placing any desired funds into the user's corresponding compartment 106. Funds that may be deposited manually include paper currency, coin currency, checks, IOUs, and so forth. If a user selects the manual deposit option, the user may be presented with the deposit fund type selection interface 504, shown in FIG. 5b, which can list the fund types or combinations of fund types 506 that the user can deposit. Once the user selects an appropriate fund type option, a funds quantity interface 508 may be displayed to a user.

The funds quantity interface 508 can include one or more fund type categories 510, with the particular categories displayed depending on the fund type option that the user had selected in interface 504. In the exemplary interface 508 shown in FIG. 5c, the user has selected to deposit paper currency, coin currency, and checks/IOUs. Each fund type category 510 can include a plurality of entry boxes 512 that allow the user to enter the quantity of each denomination of each currency type, or the dollar value of each check or IOU that is being deposited. A subtotal entry box 514 can allow the user to enter a sum for each fund type category, and a total entry box 516 can allow the user to enter the total sum of all funds that are being deposited.

The user may configure software 300, for example by accessing the Deposit Settings option of the Operations menu, to either request that the user manually enter totals and subtotals in entry boxes 514, 516, or to calculate the totals and subtotals automatically. If the manual option is selected, the software can check the user's entries to determine that the sums are correct. If the automatic option is selected, the software can simply display the sums. If the sums are incorrect, the user may be prompted to reenter the correct sum. If the sums are correct or automatically calculated, the user can select deposit widget 518 to display a confirmation interface 520, shown in FIG. 5d.

The deposit confirmation interface 520 can display to the user the entered denominations, quantities, subtotals, and total for all fund types. Additionally, the confirmation interface can provide the user with confirmation options 522, including confirm and finish, confirm and allocate, confirm and source, and confirm and new deposit. Selecting confirm and finish confirms the deposit and returns the user to the main menu interface 400, while selecting confirm and new deposit confirms the deposit and returns the user to the main deposit interface 500.

Figure 5E:
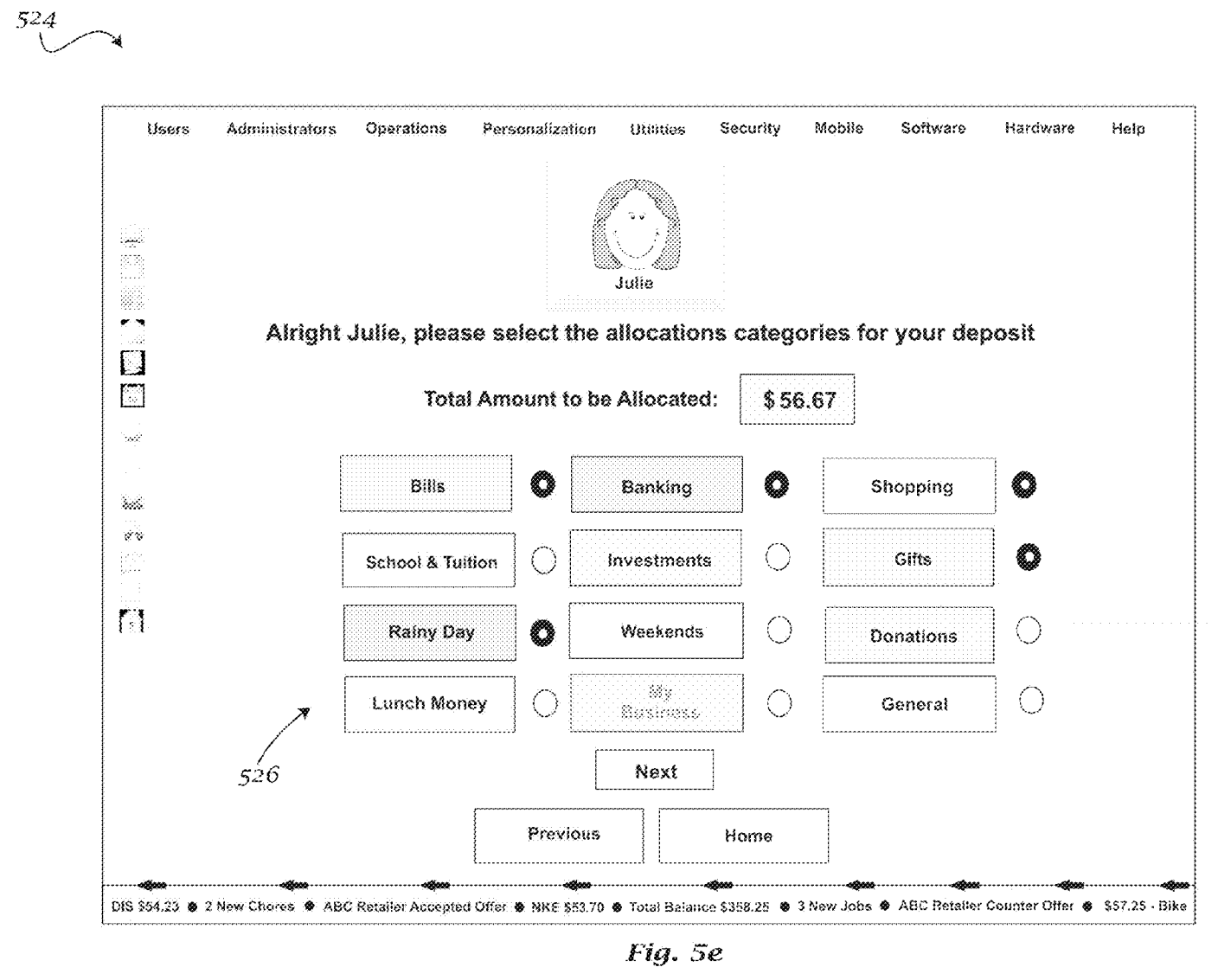
Figure 5F:
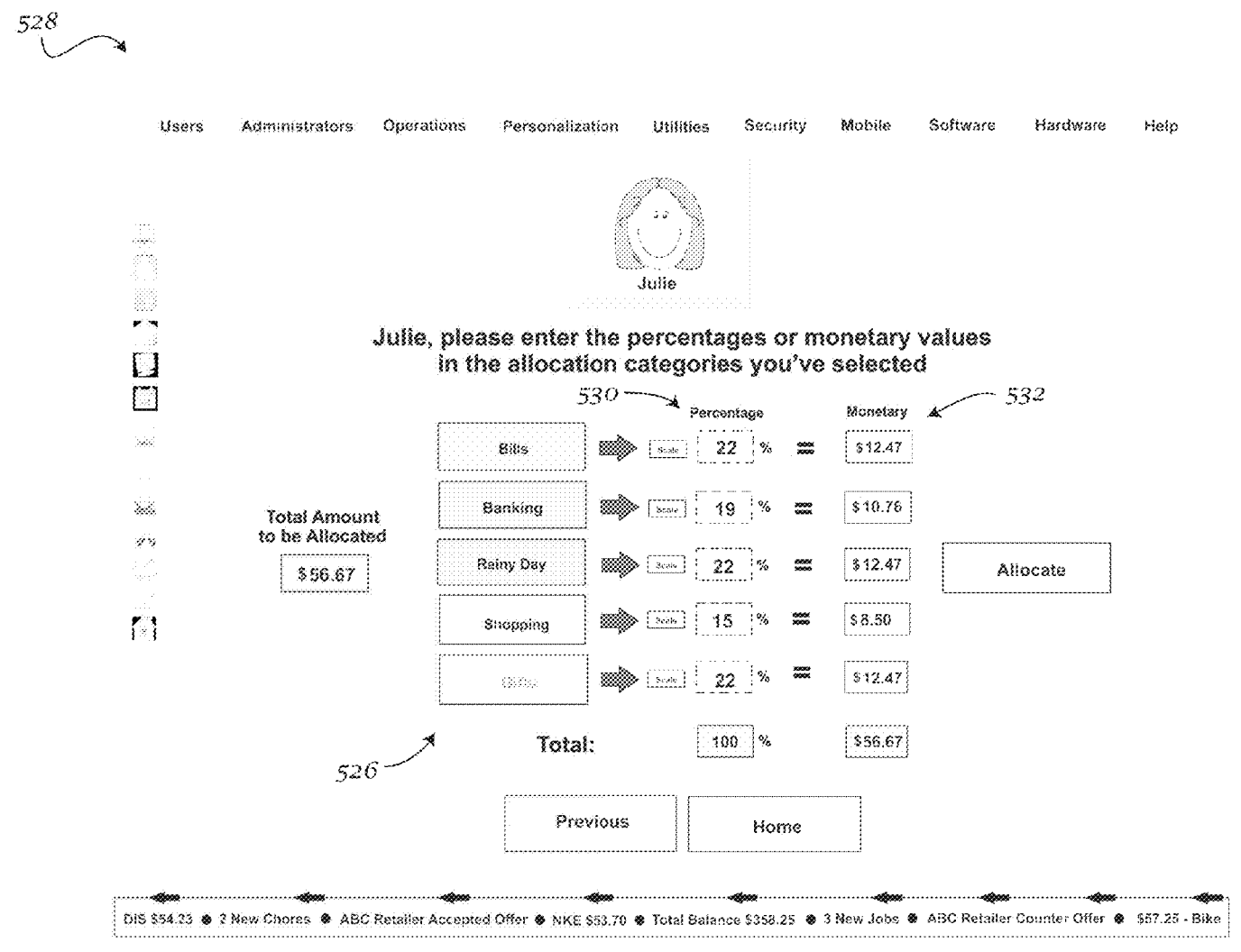

Selecting confirm and allocate can confirm the deposit and present the user with an category selection interface 524, shown in FIG. 5e. The category selection interface can present the user with a plurality of categories 526, of which the user can select one or more categories into which the user desires to allocate the deposited funds. Subsequently, the user can allocate a desired amount of deposited funds into the selected categories via an allocation interface 528. The user may allocate the funds into selected categories 526 by percentage of the deposit 530, or by a monetary amount 532. Software 300 can then calculate and display the corresponding monetary amount or deposit percentage, based on the user's entry. Subsequently, the user can select an allocate widget to be presented with a confirmation interface, displaying the user-entered allocations and a plurality of confirmation options, including confirm and finish, confirm and source, and confirm and new deposit. The functionality of the confirmation options may be substantially the same throughout the various deposit interfaces.

Figure 5G:
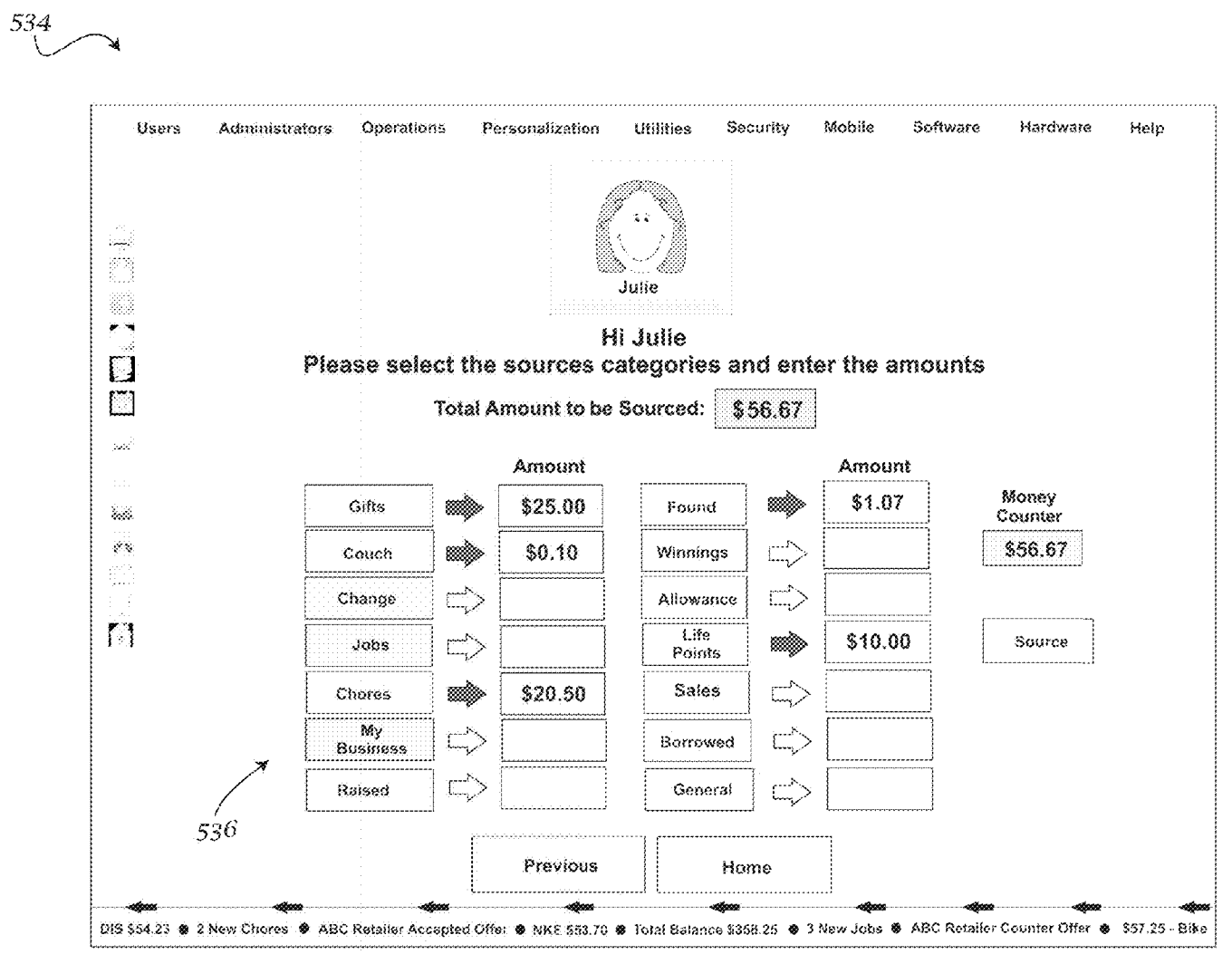

Selecting confirm and source can confirm the deposit and present the user with a deposit sourcing interface 534, shown in FIG. 5g. The deposit sourcing interface can present the user with a plurality of categories 536, of which the user can select one or more categories from which the deposited funds were sourced. The user can then enter the amount of funds sourced from each selected category. Subsequently, the user can select a source widget to be presented with a confirmation interface, displaying the user-entered deposit source amounts and a plurality of confirmation options, including confirm and finish, confirm and allocate, and confirm and new deposit.

Turning back to FIG. 5a, a user can also choose to deposit funds by utilizing the electronic coin acceptor assembly 122 and the camera 128 of apparatus 100. The user can select the electronic deposit option in interface 500 to deposit coins via coin acceptor assembly 122, the camera deposit option to deposit paper currency via camera 128, or the hybrid option to deposit both coins and paper currency via a combination of the coin acceptor and the camera. Subsequently, software 300 can prompt the user, via one or more interfaces, to deposit coins via the coin acceptor 122, and/or to place paper currency in front of camera 128. When coin currency is being deposited, the coin acceptor assembly can determine the denomination and quantity of each denomination of coins deposited and communicate the information to software 300. Once all coin currency has been deposited, the user can indicate to software 300 to deposit paper currency or to proceed to a deposit confirmation interface. When paper currency is placed in front of camera 128, software 300 can analyze a captured image of the currency to determine the denomination of the paper currency. The user can then indicate to software 300 to scan additional paper currency, to deposit coin currency, or to proceed to a deposit confirmation interface. The deposit confirmation interface, which may be substantially similar to interface 520, can display the total amounts of coin and paper currency deposited, subdivided by denomination and indicating the quantity of each denomination deposited. The user can then select one a plurality of confirmation options, including confirm and finish, confirm and allocate, and confirm and new deposit, which may have functionality substantially similar to that described above.

A user can withdraw funds from their account with apparatus 100 by using the Withdraw application. The user may withdraw funds via either a quick withdrawal procedure or a detailed withdrawal procedure. The quick withdrawal procedure enables the user to withdraw money from their account without recording the savings allocations category from which the funds are being withdrawn and without recording the denominations of the funds. Conversely, the detailed withdrawal procedure enables the user to record the savings allocations category from which the funds are being withdrawn, and/or the denominations of the funds.

Upon selecting the Withdraw application, the user may be presented with a menu interface and a choice of a quick withdrawal or a detailed withdrawal. If the user selects the quick withdrawal, the user may be presented with an entry box where the user can enter the monetary value of the funds being withdrawn. The user can then elect to withdraw more funds, or confirm the withdrawal and withdraw the funds, for example, by removing cap 104 so as to access the user's compartment 106. Upon confirmation, software 300 can display main menu interface 400.

If the user selects the detailed withdrawal, the user may be presented with a withdrawal category interface, which may be substantially similar to interface 524. The withdrawal category interface can present the user with a plurality of categories, of which the user can select one or more categories from which the user desires to withdraw the funds. Subsequently, the user may be presented with a withdrawal allocation interface, which may be substantially similar to interface 528, wherein the user can enter an amount of funds to be withdrawn from each of the selected categories. Subsequently, the user may be presented with a funds quantity interface, substantially similar to interface 508, wherein the user can enter the quantity of each denomination of each currency type that is being withdrawn. As in interface 508, the totals and subtotals may be manually entered by the user or automatically calculated by the software. Finally, the user may be presented with a withdrawal confirmation interface with can display to the user the amounts withdrawn of each fund type, as well as the total amount withdrawn. The confirmation interface can also present the user with confirmation options, including confirm and finish and confirm and withdraw more.

Figure 6A:
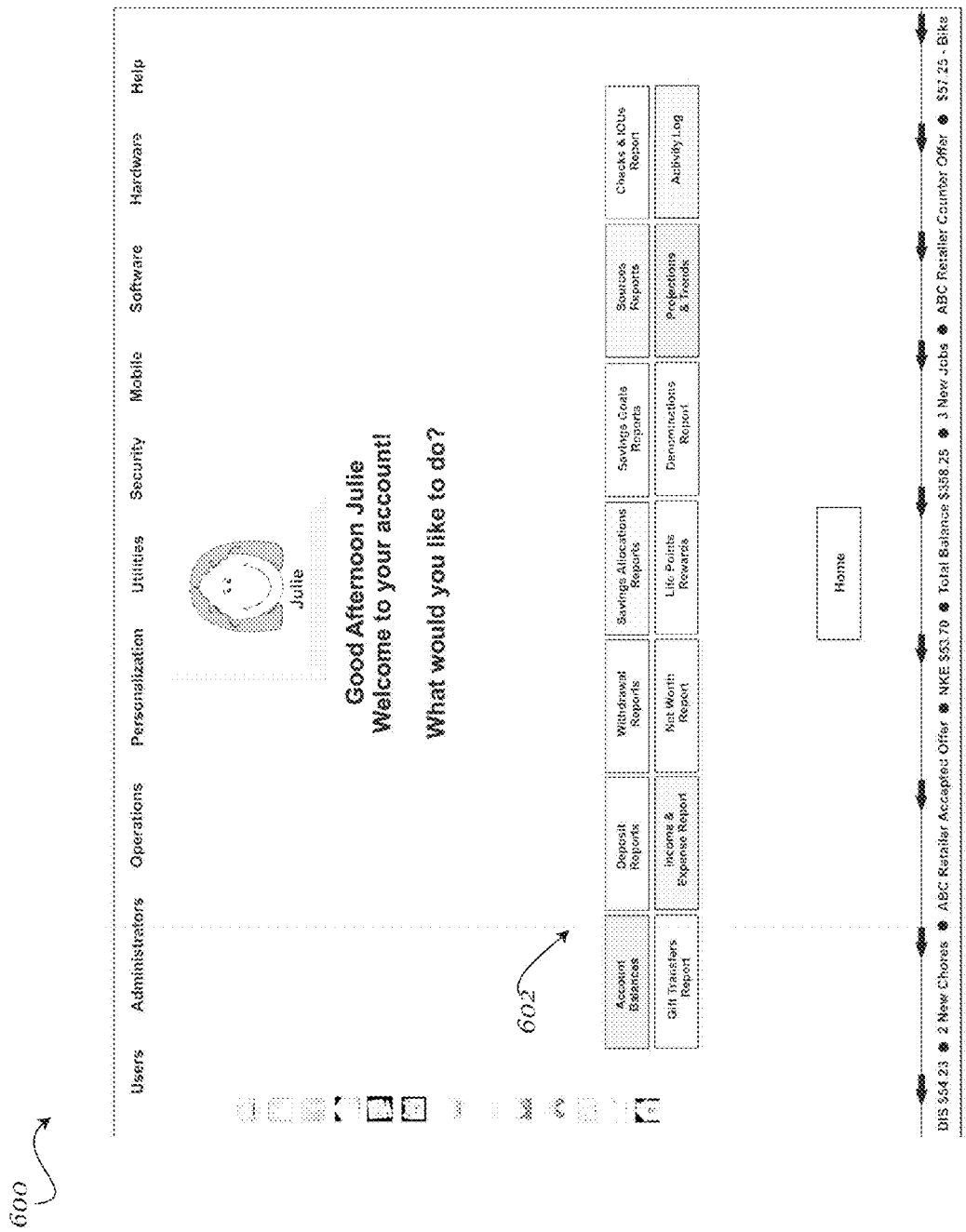
Figure 6B:
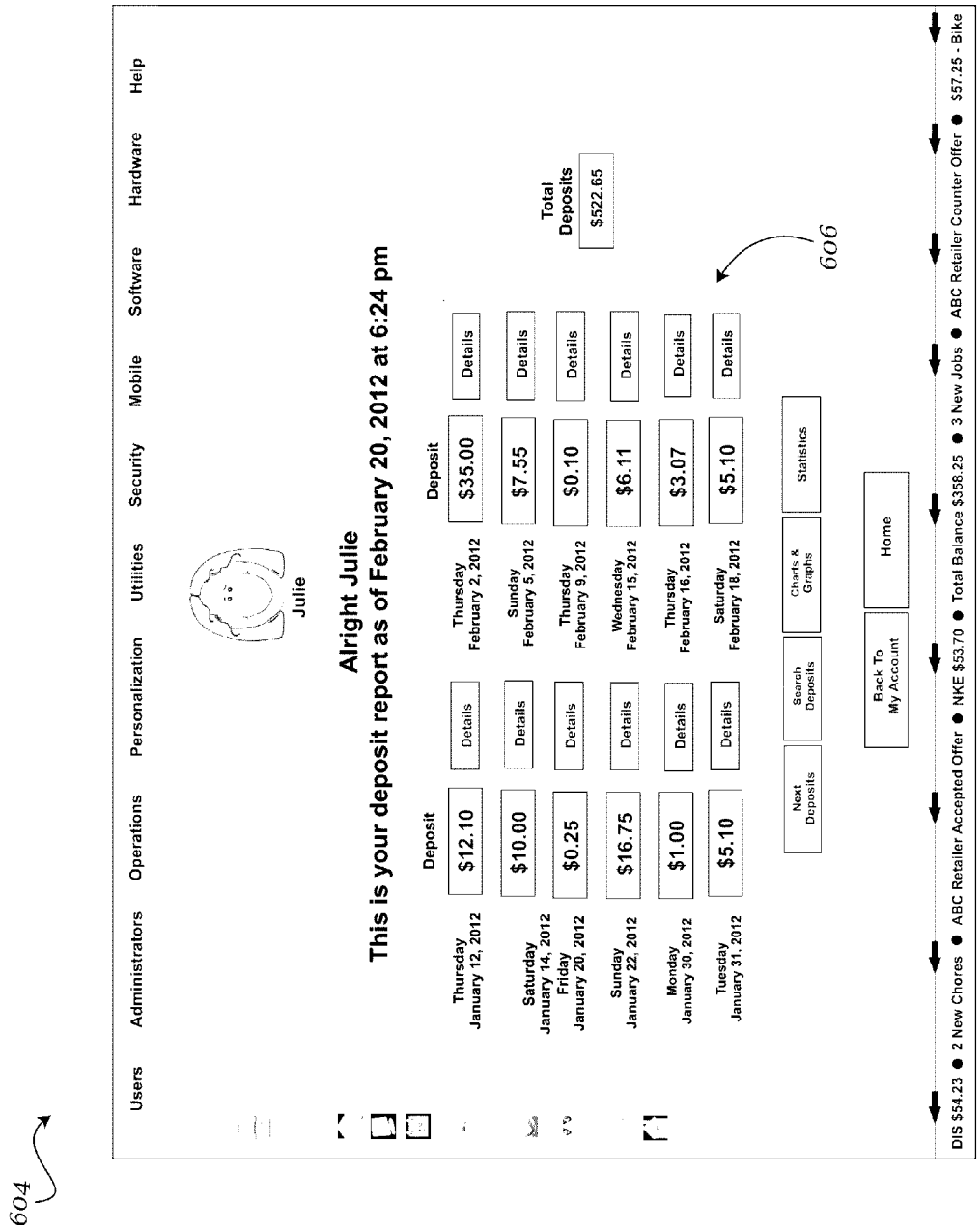
Figure 6C:
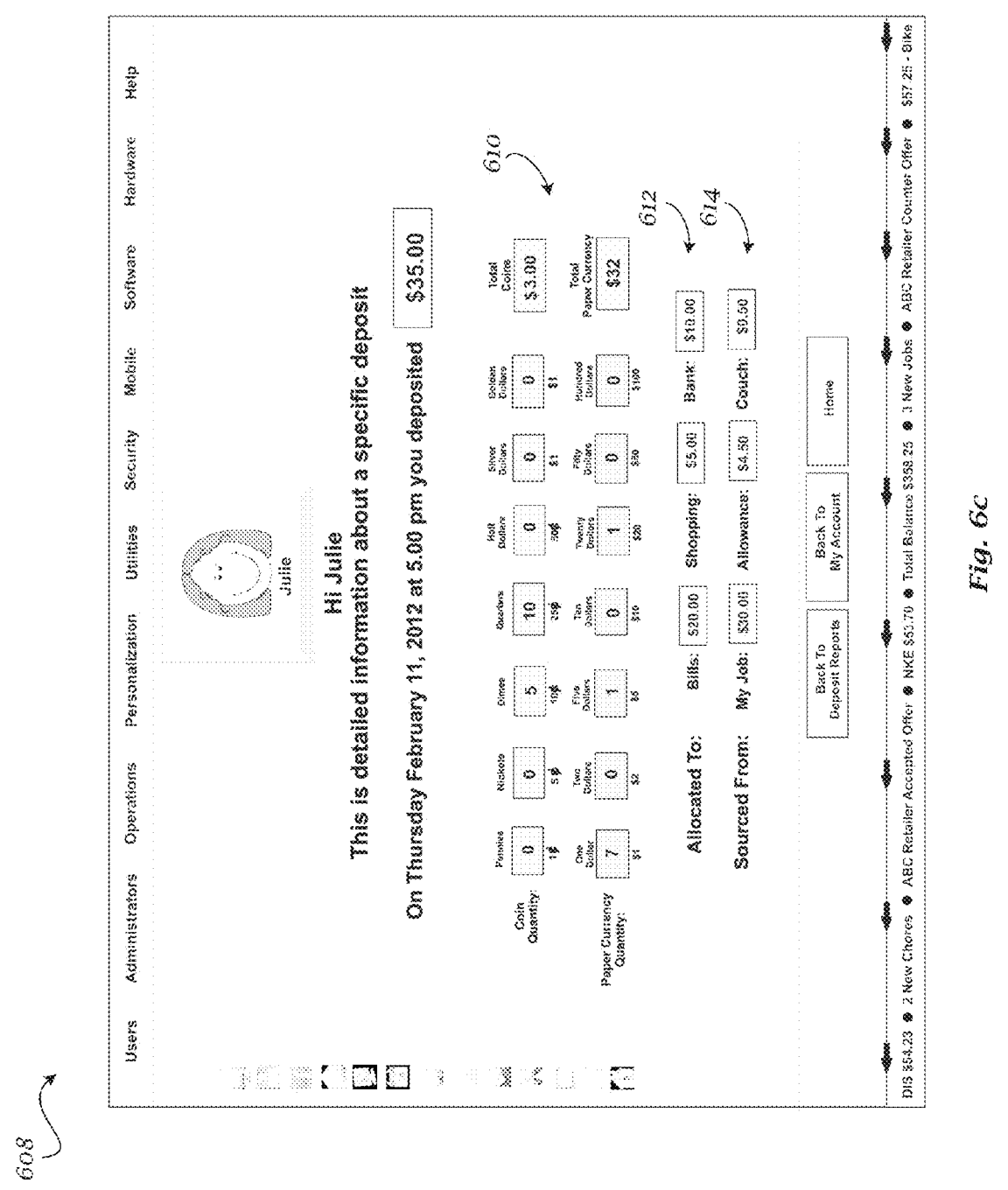

Turning to FIGS. 6a-6c, the My Account application can display a variety of information and reports to the user regarding the status of the user's account. FIG. 6a shows an exemplary main account menu interface 600, including a plurality of account-related reporting options 602 which the user can select to display further detail. The reporting options can include, for example, Account Balance, Deposit Reports, Withdrawal Reports, Savings Allocations Reports, Savings Goals Reports, Sources Reports, Checks & IOUs Report, Gift Transfers Report, Income & Expenses Report, Net Worth Report, Life Points Rewards, Denominations Report, Projections & Trends and Activity Log.

If the user selects the Account Balance option on the main account menu interface 600, an account balance interface can be displayed, including a coin currency balance, paper currency balance, check/IOU balance, credit transfer balance, and total balance. A Mix Balance option can allow the user to view customized balances from two or more funds categories.

Selecting the Deposit Reports option on the main account menu interface 600 can display a deposit history interface 604, shown in FIG. 6b, showing the history 606 of the user's deposits to their account. For example, the deposit interface can show the monetary values, dates, and times of a desired amount of previous deposits to the account, as well as a total amount of the displayed deposits. The deposits interface can further allow the user to see deposits for a desired date range, to page forward and back in the deposit history so as to display successive ranges of deposits, and to search deposits for a particular date or date range or a specific deposit transaction. Furthermore, charts and graphs and statistics options can also be presented to the user. The user can select the Charts & Graphs option to access a variety of graphic information and illustrations pertaining to deposit transactions, including but not limited to, column graphs, bar graphs, pie charts, line graphs and area graphs. The user can also select the Statistics option to access a variety of statistical information pertaining to deposit transactions, including but not limited to, data comparison statistics, means, medians and modes statistics, average daily, monthly, quarterly and yearly deposit statistics.

Additionally, a details option can be provided with each deposit transaction, which the user can select so as to display a deposit details interface 608, shown in FIG. 6c. The deposit details interface 608 can show the specific funds, denominations, and quantities deposited for that transaction 610, as well as the allocations 612 and sources 614 of the funds deposited in that transaction, if available. Options to allocate unallocated quantities of deposited funds or to source unsourced quantities of deposited funds can also be presented to the user in the details interface.

Selecting the Withdrawal Reports option on the main account menu interface 600 can display a withdrawal history interface, showing the history of the user's withdrawals from their account. The withdrawal history interface can be substantially similar to, and can have substantially similar functionality as the deposit history interface 604, including withdrawal details, statistics, and charts and graphs, as well as allocations of withdrawn funds.

Figure 6D:
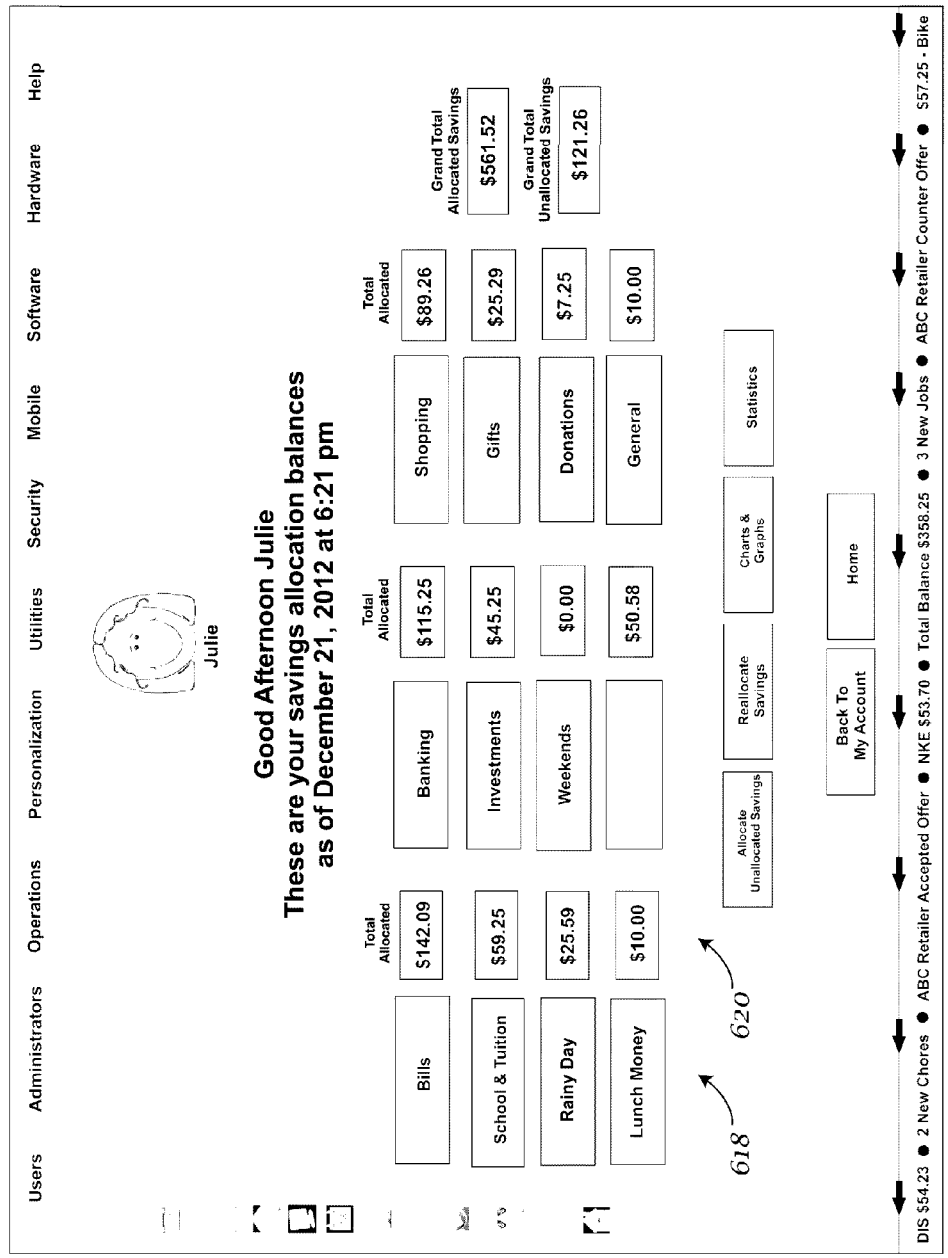
Figure 6E:
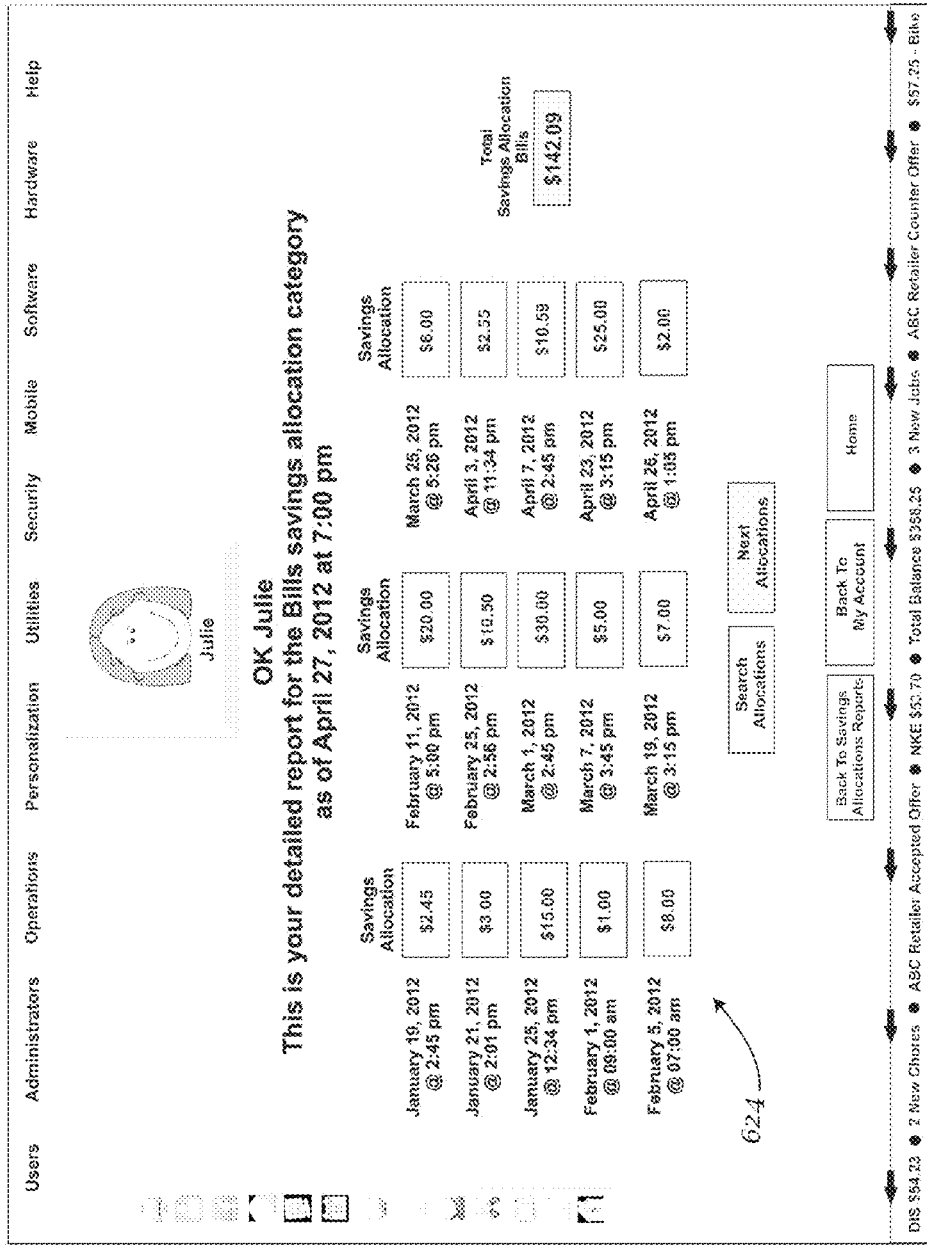

Selecting the Savings Allocation Reports option on the main account menu interface 600 can display savings allocation balance interface 616, shown in FIG. 6d. The savings allocation balance interface 616 can display a plurality of allocation categories 618 along with the amounts of funds 620 in the user's account that have been allocated to each category. Such allocation categories can include, for example, Bills, School & Tuition, Emergencies, Lunch Money, Banking, Investments, Lending, My Business, Shopping, Gifts, Donations and Other. A total of all allocated funds in the user's account as well as a total of all unallocated funds in the user's account can also be displayed. The user can also be presented with options to allocate unallocated funds and to reallocate funds that have already been allocated. Options to display charts and graphs and statistics pertaining to the allocations of the funds in the user's account can also be presented. The user can also select any displayed category to shown a allocation category details interface 622, shown in FIG. 6e. The allocation category details interface 622 can show the history 624 of the allocations made by the user into the particular category. For example, the allocation details interface can show the monetary values, dates, and times of a desired amount of the allocations made to that category, as well as a total amount of the displayed allocations. The deposits interface can further allow the user to see allocations for a desired date range, to page forward and back in the allocation history so as to display successive ranges of allocations, and to search allocation for a particular date or date range or a specific allocation.

Selecting the Savings Goals option on the main account menu interface 600 can display a savings goals interface, which can display a list of the savings allocation categories, along with a corresponding savings goal value for each category. The user can select a particular category to display savings goal details for that category, such as, for example, Today's Date, Savings Goal Start Date, Savings Goal End Date, Savings Goal Amount, Current Saved Goal Balance, Goal Balance Remaining, Total Save Days and Save Days Remaining. The user can further edit the savings goals details as desired to set particular savings goals and desired dates for reaching the goals.

Selecting the Sources Reports option on the main account menu interface 600 can display a savings sources interface. The savings sources interface can be substantially similar in configuration to the savings allocations interface, and can display a plurality of funds source categories along with the amounts of funds in the user's account that have been sourced from each category. Such source categories can include, for example, Gifts, Couch, Change, My Job, Chores, My Business, Crowdfund, Found, Winnings, Allowance, Refunds, Borrowed and Other. A total of all sourced funds in the user's account as well as a total of all unsourced funds in the user's account can also be displayed. The user can also be presented with options to source unsourced funds, as well as to display charts and graphs and statistics pertaining to the sources of funds in the user's account. Selecting a source category can display to the user a source details interface. The source details interface may be similar in configuration to the allocations details interface, and can display detailed information pertaining to the source category, such as amount of funds in the category as well as the date and time of sourcing. The user can also view funds sources for a desired date range, to page forward and back in the source history so as to display successive ranges of sources, and to search sources for a particular date or date range.

Figure 6F:
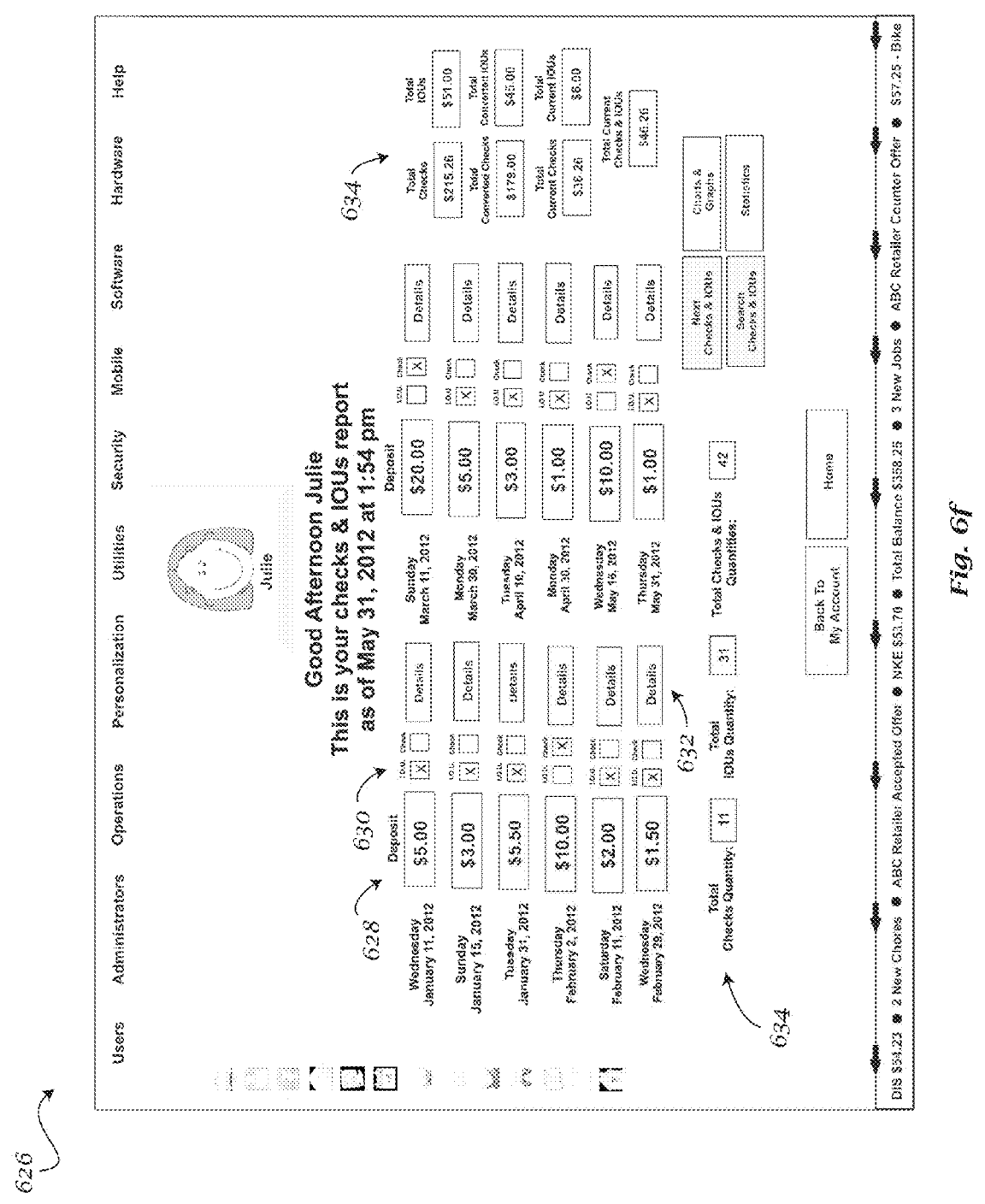

Selecting the Checks & IOUs Report option on the main account menu interface 600 can display a checks and IOUs interface 626, shown in FIG. 6f. The checks and IOUs interface 626 can display a history of the user's deposits of checks and IOUs to their account. For example, the interface 626 can show the monetary values, dates, and times 628 of a desired amount of previous check and IOU deposits to the account, an identification 630 of each deposit as a check or IOU, as well as a details option 632 for each deposit. The checks and IOUs interface can further allow the user to see deposits for a desired date range, to page forward and back in the deposit history so as to display successive ranges of deposits, and to search deposits for a particular date or date range or a specific deposit transaction. Furthermore, fields 634 showing the total amount of check funds deposited, the total amount of IOU funds deposited, the total amount of check funds that have been converted to cash, the total amount of IOU funds that have been converted to cash, the remaining unconverted check funds, the remaining unconverted IOU funds, and the total unconverted funds can also be shown. Selecting the details option pertaining to a particular check or IOU deposit can show the value of the check or IOU deposit, the payer of the check or IOU, whether the check or IOU has been converted to cash, whether the check or IOU has been redeposited as cash into apparatus 100, and the dates of such conversion and redepositing.

Selecting the Gift Transfers Report option on the main account menu interface 600 can display a gift transfers report interface showing a history of gift transfers into the user's account. The financial management education system 200 can allow individuals, for example friends or family of a particular user, to make gift transfers to the user's account. The transfers may be performed, for example, via a web interface provided by server 206, wherein the done can execute a transfer from the donor's credit card, debit card, or bank account, directly to the account of the desired user.

The gift transfer interface can show the monetary values, dates, and times of a desired amount of previous gift transfers to the account, as well as a details option for each gift transfer. The gift transfer interface can further allow the user to see gift transfers for a desired date range, to page forward and back in the transfer history so as to display successive ranges of gift transfers, and to search gift transfers for a particular date or date range or a specific transaction. Furthermore, fields showing the total amount of gift transfer received, the total amount of gift transfers that have been converted to cash, the remaining unconverted gift transfers, and the total number of gift transfers can also be shown. Selecting the details option pertaining to a particular gift transfer can show the value of the gift transfer, the donor of the gift transfer, whether the gift transfer has been converted to cash, whether the gift transfer has been redeposited as cash into apparatus 100, and the dates of such conversion and redepositing.

Figure 6G:
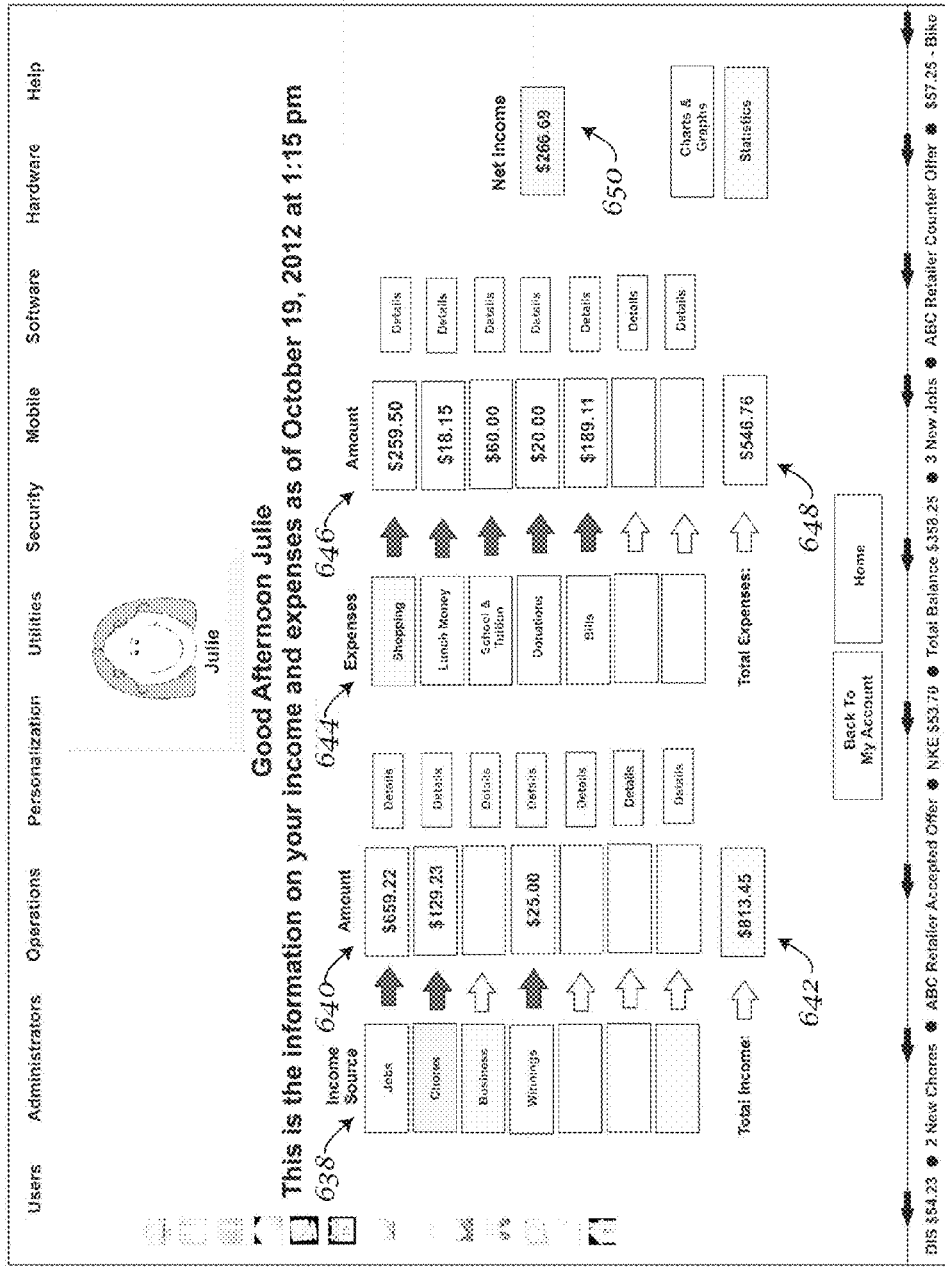
Figure 6H:
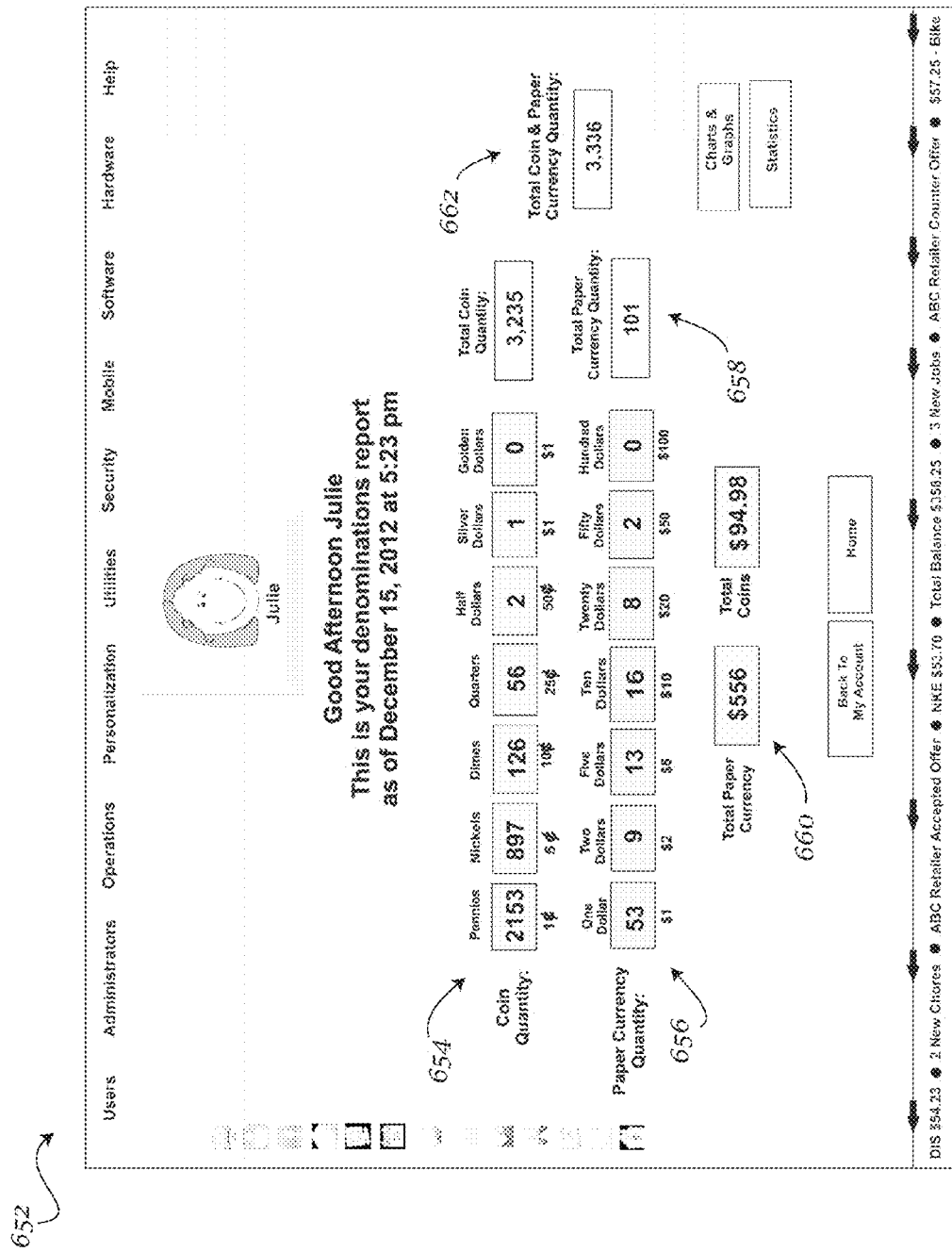

Selecting the Income and Expense Report option on the main account menu interface 600 can display the income and expense report interface 636 shown in FIG. 6g. The income and expense report interface 636 can display the user's income source categories 638, the incomes for each category 340, and a total income amount 642. The income and expense report interface 636 can also show the user's expense categories 644, the amount spent in each category 646, and the total expense amount 648. The net income 650 can also be shown. Details options may be provided for each income and expense category.

Selecting details options for a category allow the user to view a transaction list for that category for a desired date range, to page forward and back in the transaction list so as to display successive ranges of transactions, and to search transactions for a particular date or date range or a specific transaction. Furthermore, charts and graphs and statistics options can also be presented to the user. Additionally, a details option can be provided for each transaction, which the user can select so as to display the specific funds, denominations, and quantities used in that transaction, as well as the allocations and sources, and/or expense categories for the funds involved in the transaction, if available.

Selecting the Net Worth Report option on the main account menu interface 600 can display a net worth report interface, which may be substantially similar to the income and expense report interface. The net worth report interface can display the user's assets categories, the amount of assets in each category, and a total assets amount. The net worth report interface can also show the user's liability categories, the amount of liabilities in each category, and the total liabilities amount. The total net worth can also be shown. Details options may be provided for each assets and liabilities category. Furthermore, charts and graphs and statistics options can also be presented to the user.

Selecting the Life Points Rewards option on the main account menu interface 600 can display a life points interface. The life points interface can be substantially similar in configuration to the deposit history interface 604, and can display a log of the user's life points activity, a life points conversion report, and an option to convert life points. Life points can be rewards given to a user in exchange for the performance of certain activities. Life points can then be converted to a monetary value according to a conversion rate. Life points, the activities for which life points are rewarded, the amount of life points rewarded for each activity, and the life point conversion rate may be set up by an administrator of apparatus 100 for each user of apparatus 100. For example, an administrator may award 10 life points for reading a financial education website, 50 life points for achieving a preset savings goal, and 20 life points for playing a financial game, and set up an exchange rate of one dollar for 50 life points. Once the user performs the desired activity, the life points can be deposited into the user's account. The user can then convert the life points into currency at a desired time.

The life points activity log can display to the user a log of the instances of life points rewards for a desired date range, to page forward and back in the life point reward list so as to display successive ranges of rewards, and to search the reward list for a particular date or date range. A total current life point amount and an option to convert life points can also be displayed. Details options may be provided for each life points reward instance. Selecting the details options can display details as to the particular life points reward, including date and time of reward, amount of life points rewarded, the individual who rewarded the life points to the user, the action for which the life points were rewarded, the duration of the action, and the date and time of the action.

Clicking on the life points conversion option on the life points menu interface can display a life points conversion report, showing the total life points awarded to the user, the total life points converted by the user, and the remaining balance of unconverted life points. Clicking on the convert life points option on the life points menu interface can display a life points conversion interface, which can show the user's current life point balance and the conversion rate, and can further allow the user to enter an amount of life points to be converted into a cash value.

Figure 6I:
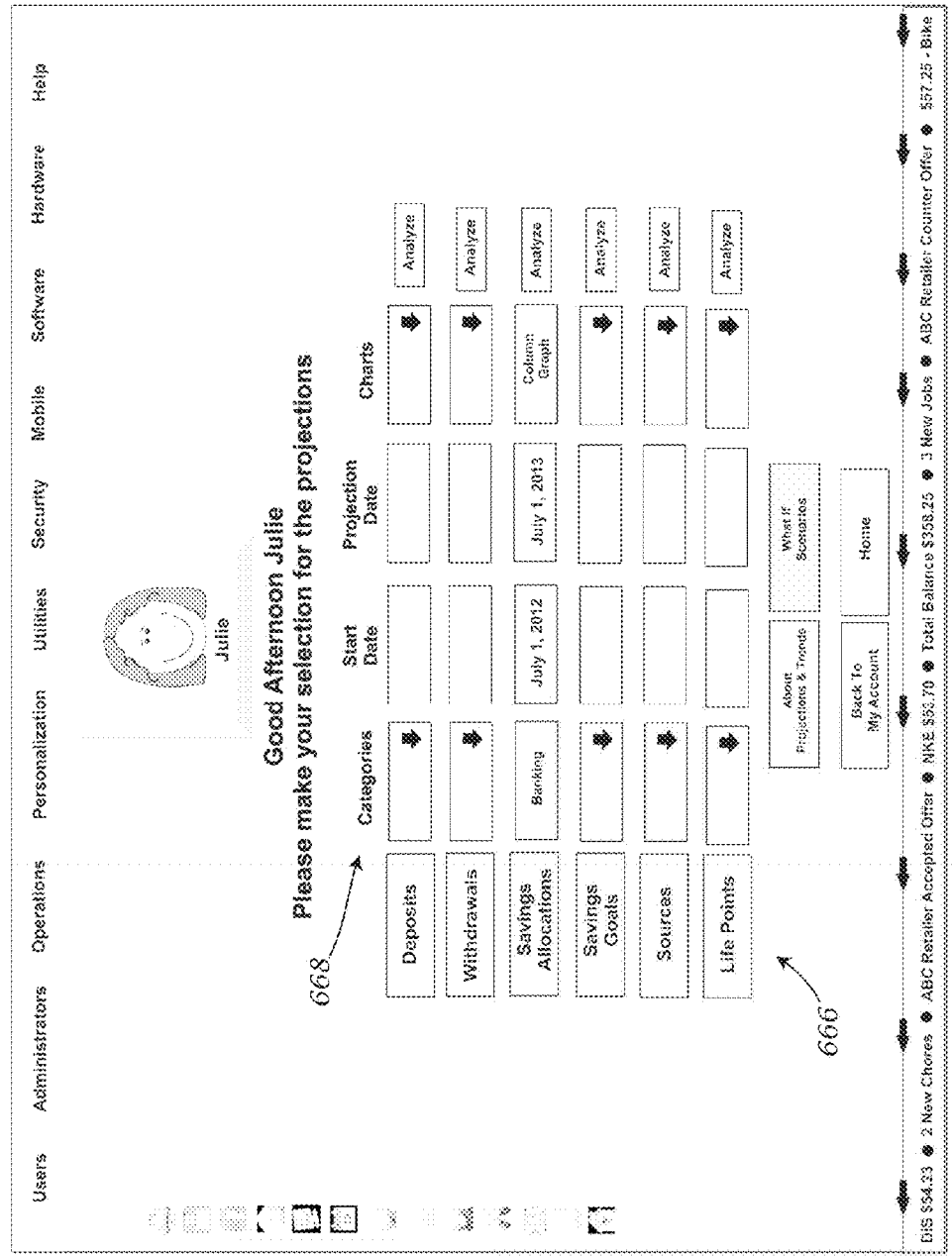
Figure 6J:
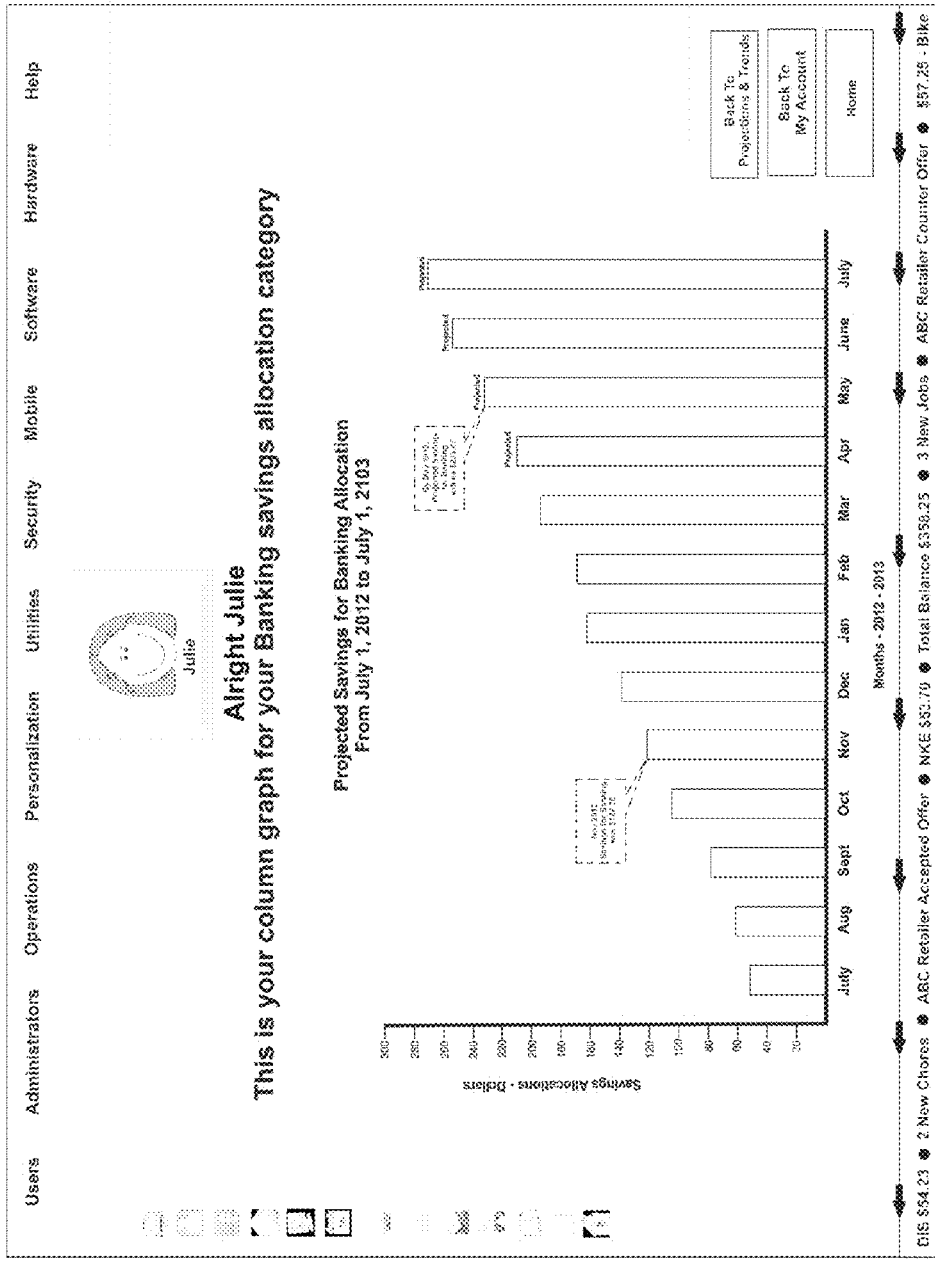

Selecting the Denominations option on the main account menu interface 600 can display a denominations report interface 652, shown in FIG. 6i. The denominations report interface 650 can display all the coin denominations 654 and all paper currency denominations 656 currently in circulation, as well as the quantity of notes or coins of each denomination that are in the user's account. The denominations report interface can further display the total amount of coins and paper currency 658 in the user's account, subtotal cash values of the coins and notes 660, and the total cash value 662 of the coins and notes in the user's account.

Selecting the Projections and Trends option on the main account menu interface 600 can display a projection and trends interface 664, shown in FIG. 6i. The projections and trends interface 664 can display data pertaining to the user's account in a variety of graphic forms, such as column graphs, bar graphs, line graphs, and area graphs. The user can select from a variety of categories 666 for which to display projections and trends, including Deposits, Withdrawals, Savings Allocations, Savings Goals, Sources and Life Points. For each category, the user can input criteria 668 including a start date, a projection date, and a chart type. The user can then select to analyze the category based on the criteria, with the software returning a graphic chart display 670, shown in FIG. 6j, based on historical data and trends and showing a future projection for the particular category.

Selecting the Activity Log option on the main account menu interface 600 can display an interface showing the user's activity with software 300, including but not limited to, deposits, withdrawals, account access, credit transfers, profile changes, content downloads, resources access, demo trading activities, homework reviews, financial games played, fund raising activities, password changes, print activity, and so forth. The activity log can also display all activity for a desired date range, to page forward and back in the activity log so as to display successive ranges of activity, and to search the reward list for a particular date or date range.

Additional utility applications 314 may be provided as part of software 300. Such utility applications can provide the user with a variety of activities that facilitate financial education, entrepreneurship education and life management in general by engaging in a variety of actions and exercises. Some utility applications may be provided in conjunction with one or more affiliates 214 of the system for financial education, entrepreneurship education and life management 200.

Communications between software 300 and affiliates, such as retailers, banks, investment brokerage firms, and so forth, can be facilitated by Web Services via the Internet or by an Application Programming Interface. This can allow affiliates to provide a customized experience for the user via software 300. Furthermore, software 300 can receive data-induced communications from the affiliate and display them to the user. Data-induced communications can include audio and visual communications that can be transferred to a user's account after a predetermined set of data has been retrieved from the user's account by the affiliated retailers, banks and investment brokerage firms. Data-induced communications can promote and reinforce the benefits of banking, debt-free consumption, saving money, investing in the stock market, and so forth. For example, affiliates could utilize data-induced communications to send a variety of entertaining, congratulatory, or motivating messages to the user that promote prudent savings and consumption practices, such as achieving money savings goals or investment goals, messages of encouragement based on savings trends, and offers for products and service based on the accumulated savings in the user's account. As a further example, messages may be sent by an affiliated retailer when the user has achieved a savings goal that enables the purchase of a specific product or service, or when the user has achieved certain savings goals in general. Messages may also be sent by an affiliate based on the user's money savings trends or based on the accumulated cash savings in the user's account. Additional information may be sent to enhance communications with certain affiliates, for example price negotiations, special and seasonal offers, and so forth.

The My Banking utility application can allow the user to learn the basic principles of banking by engaging in a variety of banking activities, exercises and games. The user can manage virtual bank accounts for the purposes of gaining banking experience. The My Banking utility can include a Demo Banking function that allows the user to learn the fundamentals of commercial banking, including but not limited to, managing checking, savings and certificate of deposit accounts, depositing and withdrawing funds, using credit and debit cards, paying bills online, understanding overdraft protection, using automatic teller machines and understanding bank statements and maintaining bank account ledgers. A demonstration bank account can be designed to simulate the functionality of a real bank account whereby the user can perform all the banking activities normally associated with a real bank account using imaginary or virtual money.

The My Banking utility can further include a Commercial Banking function which can provide the user with direct access links to the online systems of affiliated commercial banks. The user can connect to their account with an affiliated commercial bank and manage their account via software 300.

Additional features of the My Banking utility can include Banking Message Boards showing communications between the user and affiliated banking institutions, Bank Allocation balance showing the user's total funds for each bank account, Banking Games, providing interactive games and activities relating to banking, and Banking Resources, providing educational and informational material regarding the banking industry and money management.

The My Investments utility application can allow the user to learn the basic principles of investing in the stock market by buying and selling stocks and bonds of real companies listed on the major stock exchanges utilizing a virtual demonstration trading account. A Demo Trading function of the My Investments utility application can allow the user to engage in simulated trading in stocks and bonds through a virtual demonstration trading platform using virtual or fictitious money. The Demo Trading utility can allow the user to learn and understand the fundamentals of stock market investments, for example opening brokerage accounts, researching stocks and bonds, understanding stock quotes, understanding spread prices, placing buy and sells orders, selecting share allotments, understanding limit and stop orders and understanding brokerage statements. The demonstration trading account can be designed to simulate the functionality of a real brokerage account whereby the user can perform all the brokerage activities normally associated with a real brokerage account using virtual money for the purposes of gaining trading experience without the risk of real monetary losses. The user can execute trades based on real-time movements of stock and bond prices of companies listed on the major stock exchanges in the United States. As an example, the demonstration trading platform could credit the user with $100,000 in virtual money to buy and sell stocks and bonds and create trading portfolios of listed companies. Portfolios can be managed by the user as a way to learn, practice and test trading strategies prior to engaging in actual trading. Stock and bond price quotes can be displayed in real time or with time interval delays. The demonstration trading platform also incorporates an entertaining feature that enables the user to create intra-household and inter-household trading groups in order to compete against other users of apparatus 100 based on virtual stock and bond portfolio returns.

The My Investments utility can further include a Brokerage Trading Station function which can provide the user with direct access links to the online systems of affiliated investment brokerage firms. The user can connect to their account with an affiliated investment brokerage firm and manage their account via software 300. The My Investments Utility can include safeguards to ensure that trading is not being carried out by individuals under the age of 18, in accordance with applicable securities laws. For example, an administrator user account may be required to grant access. In another embodiment, if an attempt was made to access a brokerage trading platform, the camera and facial recognition software could activate, scan and verify that the user is authorized to access the brokerage trading platform. If the user is authorized to access the brokerage trading platform, an administrator can also establish a set of rules governing trading parameters, for example establishing a limit on the monetary value of each stock or bond trade, maximum value of portfolio exposure and price limitations on individual stocks and bonds.

Additional features of the My Investments utility application can include Investments Message Boards, Investment Allocation Balance, Investment Games and Investment Resources.

The My Shopping utility application can allow the user to shop for and purchase products and services from affiliated retailers, learn financial responsibility, and develop prudent consumption habits. The My Shopping utility can include a variety of functions that teach and promote the benefits and values of prudent consumption habits, including but not limited to, debt-free consumption, saving for consumption, bargain shopping and delaying instant gratification.

The My Shopping utility can include a variety of functions, including About My Shopping, showing general information, including instructional and navigational information; Shopper Profile, showing the user's shopping profile; Shopper Account, showing information pertaining to the user's shopping account, such as a historical cash expenditure log and pending purchase orders, Affiliated Retailers, showing affiliates 214 where the user can perform shopping activities; Search & Register Products & Services, allowing the user to search for specific products and services available for sale by the affiliated retailers using keyword searches; Group Shopper, allowing the user to create a team shopping group that includes other intra-household and inter-household users of apparatuses 100 so as to secure discount pricing from affiliated retailers; Shopping Savings Goals, allowing the user to create and set savings goals for purchase of specific products and services from affiliated retailers; Purchase Report, showing historical information pertaining to all the products and services purchased by the user; Bids & Offers, allowing the user to negotiate prices of desired products and services with affiliated retailers thereby engaging in price bargaining; Shopping Allocation Balance, the user's current cash balance in the Shopping savings allocation category; and Discounts & Coupons Center, showing listing of discounts offers and coupons from affiliated retailers.

Figure 7A:
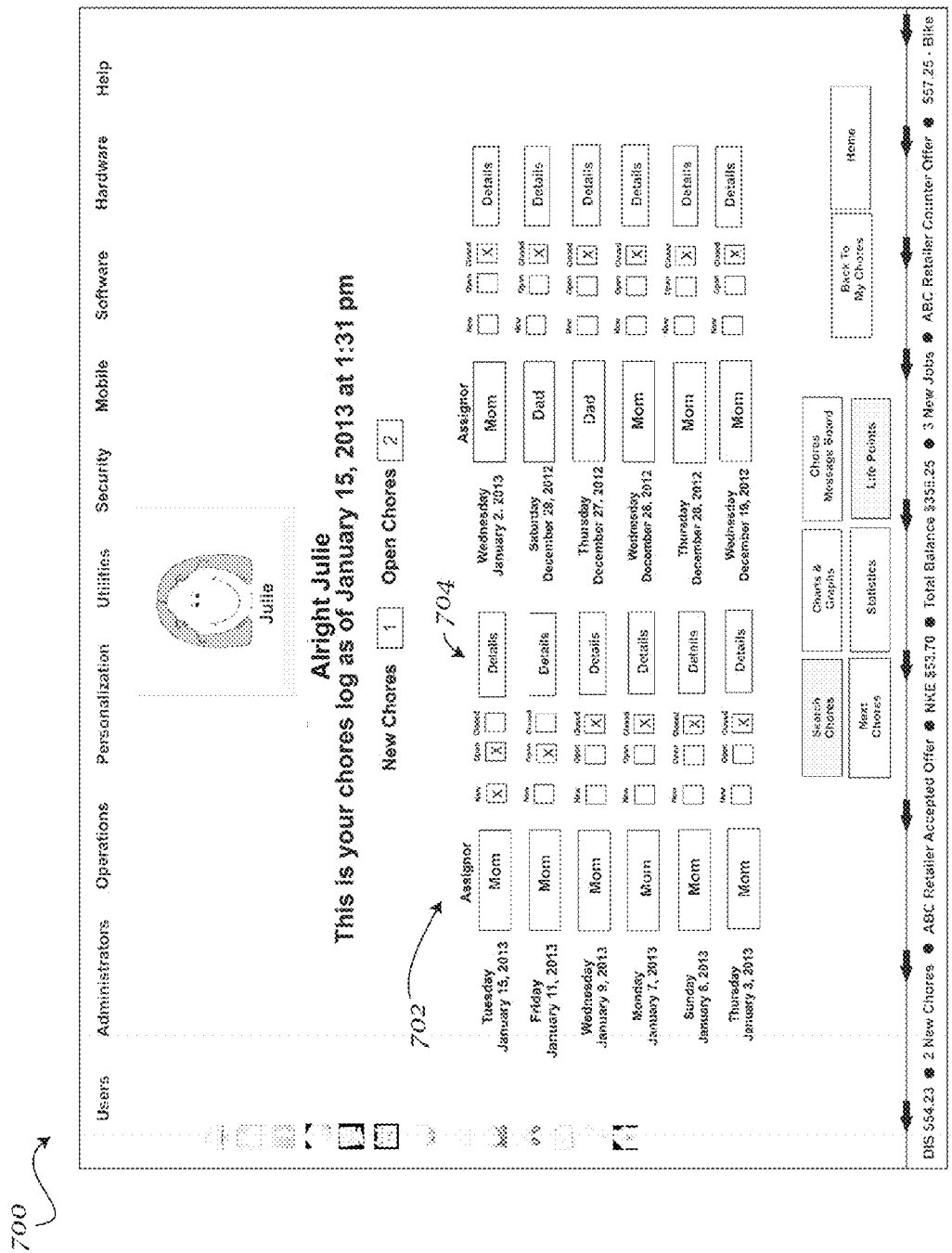

The My Chores utility can allow users and administrators, such as parents and guardians, to effectively transact and manage household chore assignments. The My Chores utility can help users develop positive personality traits such as reliability, thoroughness, persistence and dedication. The administrators, such as parents and guardians, can manage and assign chores to users and to create rewards for performing chores. A My Chores Log function can present to the user a chores log interface 700, shown in FIG. 7a. The chores log interface 700 can display a list 702 of chore assignments. Each chore assignment can be marked as new, as open or incomplete, or as completed. Additional functions can include Search Chores, Next Chores, Charts & Graphs, Statistics, Chores Message Board and Life Points. The user can also select the Search Chores function to access and display information on a specific chore assignment or a range of job assignments set between two dates. The user can select the Next Chores function to access and display information on the successive batch of chore assignments in sequential order by dates. The user can select the Charts & Graphs function to access and display variety visual graphic information and illustrations pertaining to chore assignments, such as bar charts, pie charts, line graphs and area graphs. The user can also select the Statistics function to access and display a variety of statistical information pertaining to chore assignments, such as data comparison statistics, means, medians and modes statistics, average daily, monthly, quarterly and yearly chore assignment statistics. The user can also select the Chores Message Board function to access and display a message board that lists messages pertaining to chore assignments. The user can select the Life Points function to access and display detailed information on the Life Points earned by the user for the successful completion of chore assignments including the amount of Life Points earned.

Figure 7B:

For each chore, a details option 704 may be provided. Selecting the chore details option 704 for a particular chore can display a chore details interface 706, shown in FIG. 7b. The chore details interface 706 can display various information 708 relating to the chore, for example, the date and time that the chore was assigned, the deadline for the completion of the chore, the assignor of the chores, the monetary amount the assignor shall pay the user to complete the chore, a money form for the chore payment, the number of life points the assignor shall reward the user to complete the chore, the non-cash reward the assignor shall reward the user to complete the chore, a description of the chore, and a message from the assignor of the chores. Additionally, the user can send a message to the chore assignor. The chore details interface 706 can also display an editable status 710 for the chore, which can show whether the chore is new, read, open, completed, or closed.

The My Jobs utility can allow users and registered employers to transact and manage job assignments. The My Jobs utility can help users develop positive work ethics and habits such as resourcefulness, creativity, responsibility and self-reliance. The user can manage employment opportunities and job assignments by utilizing the My Jobs utility, including searching and retrieving job assignments, communicating with registered prospective employers, negotiating fees and income, self-marketing, documenting and tracking fees and income earned and creating educational graphical illustrations that summarize job assignments information and data.

Registered prospective employers, for example neighbors, community households, schools and neighborhood businesses can post, assign and manage jobs assignments via a website in communication with system 200, which can be hosted, for example, on server 206. These job assignments can then be displayed to users via the My Jobs utility. Administrators can further review and approve prospective employers for a particular user.

The My Jobs utility can display a job listing interface substantially similar to chores log interface 700. The job listing interface can provide a variety of functions, including Search Jobs for accessing and displaying information on a specific job assignment or a range of job assignments set between two specified dates; Next Jobs, for accessing and displaying information on successive batch of jobs displayed in sequential order by dates; a Jobs Message Board tile accessing and displaying a message board that lists all messages pertaining to past job assignments; Charts & Graphs, accessing and displaying a variety visual graphic information and illustrations pertaining to past job assignments, such as bar charts, pie charts, line graphs and area graphs; Statistics, for accessing and displaying a variety of statistical information pertaining to past job assignments, such as data comparison statistics, means, medians and modes statistics, average daily, monthly, quarterly and yearly job assignment statistics; and Life Points, for accessing and displaying detailed information on the Life Points earned by the user from job assignments including reward points amounts and issue dates.

For each job assignment, a details option may be provided. Selecting details for a particular job can display a job details interface, substantially similar to chore details interface 706. Job details can include, for example, the date and time that the job was posted, the deadline for the completion of the job, the employer, the monetary amount the employer shall pay the user to complete the job, a money form for the payment, the number of life points the employer shall reward the user to complete the job, the non-cash reward the employer shall reward the user to complete the job, a description of the job, the contact information of the employer, and a message from the employer of the job. Additionally, the user can send a message to the employer. The job details interface can also display the status of the job, for example whether the job posting was read, whether the job was accepted, completed or declined, and whether the job posting is open or closed.

The My Barter & Sales Exchange utility application can allow the user to barter, sell and buy personal items by communicating with other users 202 registered with system 200. This can provide the user with exposure to commerce, asset sales, raising funds, bargaining and trade in general. The My Barter & Sale Exchange utility can allow the user to register, list and advertise new or used personal items for barter or sale to other users of system 200, including but not limited to, video games, clothing, sports equipment, comics, electronic equipment, toys and movies. The My Barter & Sale Exchange utility can also allow the user to search for, purchase and barter products listed and advertised by other users of system 200.

The Barter & Sale Exchange utility can include a variety of functions, including a user profile; a create listing function that allows the user to list an item on the exchange, including photo and video content for the item, the name of the item, a unique product desertification number, new or used declaration, the age and condition of the item, the price and information on what the item can be bartered for; and a Listed Items function, showing a list of all items available for sale and exchange.

The Listed Items function can display an interface showing the list of items with a photograph, price, identification and new or used status for each item. The Listed Items interface can further allow users to search for items by keyword or category. Each listed item can further have a details option. Selecting the details option can display a larger image of the item, additional description for the item, and options for buying or bartering the item. When buying the item, the user can further make an offer on the item that is lower than the advertised price so as to bargain for the item. Additional functions in the details interface can allow the user to view a profile of the seller or to sent a message to the seller.

Additional functions in the listed items interface can include Member Wish Lists, showing the user a listing of items that are listed as wanted items for barter or purchase by other users; Sales Report, allowing the user to access and display a historical report on all items sold by the use; Purchase Report, allowing the user to access and display a historical report on all items purchased by the user; Barter Report, allowing the user to access and display a historical report on all items bartered by the user; List Item, which can allow the user to create post and advertise items for barter and sale; and Wanted Items, which allows the user to create and post a wish list of desired products for barter and purchase.

The My Financial Planner utility can allow the user to create and manage simple financial plans that can help the user learn and understand how to track and manage spending, budget wisely, manage investments for the future and manage money in general.

The My Financial Planner utility can allow the user to create and display savings goals for various savings categories such as bills, tuition, rainy day, lunch money, investments, weekends, business, shopping, gifts, donations, and general, as well as a universal savings goal incorporating all categories. The My Financial Planner utility can further allow the user to create and display a financial plan. The financial plan may be tailored to the user's age, and could include one or more of asset registration, liabilities registration, budgeting plans, and earnings and savings plans. Age-appropriate financial plan templates may be provided to allow the users to easily create financial plans that are relevant to their needs.

The My Business World utility can allow the user to learn crucial skills and qualities that are required to become an entrepreneur, such as communicating effectively with people, being comfortable leading, networking, developing self-confidence, thinking creatively, team building, selling effectively, weighing pros and cons of potential solutions, proceeding wisely with instituting solutions, setting professional goals and understanding and embracing failures as learning opportunities. The My Business World utility can also allow the user to learn the basic principles of business such as risk taking, organizing, recognizing opportunity, researching and basic accounting principles.

The My Business World utility can provide a variety of functions. Such functions can include My Businesses, showing information pertaining to the user's active and operating businesses, such as name of businesses, description of business activities and so forth; Start Up Businesses, which can present the user with a questionnaire regarding the name of the new business, start date, nature of business and a variety of other information pertaining to starting new business; and Business Plans, which can present the user with a variety of template options for creating basic business plans for a new business venture. Such functions can also include Entrepreneurship Challenges, which can present the user with a variety of business and entrepreneurship challenges created by administrators such as parents and guardians, as well as affiliated consultants, business partners and the system and generated by software 300 based on the user's age and general knowledge skills. Such administrators and affiliates can assign monetary, non-monetary, and life point rewards for completion of business challenges, and can further create, assign and monitor custom business challenges for the user.

Additional functions of the My Business World utility can include Business Idea Center, which can provide the user with ideas on how to start popular businesses for children; Business Resources, which can present the user with information and resources pertaining to business in general, such as tips on starting and managing a small business and links to private and government organizations websites that promote and support youth entrepreneurship; Entrepreneurship Games, which can provide interactive games that can teach and inspire the user to start a business and become an entrepreneur; My Business Website, which can provide utility tools that enable the user to create and launch business websites; Entrepreneurship Mantras, which can display business and entrepreneurship mantras on the streamer; Business Allocation Balance, showing the cash account balance that has been allocated to the My Business savings allocation category, as well as projections and trends; and Business Accounting which can provide information that can allow the user to learn and understand basic business accounting principles, such as managing business accounting ledgers, understanding profit & loss reports, creating sales forecasts and reports, understanding revenues & income reports and taxation. Ask an Entrepreneur, which can allow the user to ask entrepreneurial and business related questions to affiliated business consultants and entrepreneurs via software 300;

The My Crowdfunding utility can allow the user to easily create, launch and manage crowdfunding campaigns via a website provided as part of system 200. The My Crowdfunding utility can allow a user to raise money from one or more contributors to fund the user's specified cause, such as new business ventures, charitable funding raising, community projects, special causes, school projects and events and so forth. The My Crowdfunding utility can provide a variety of functions, including Create & Launch Campaign, which can allow the user to create crowdfunding campaigns using a variety of templates, and establish rules for the campaigns such as funding goals, disbursement parameters, expiration of the campaign and fund limitations and denominations; My Campaigns, which can present a list of the user's campaigns; Monitor Campaigns, which can display information and data pertaining to the user's fundraising campaigns, such as contributed funds, credit transfers, fund balances, donor or contributors' information, activity logs and the current rules governing the fundraising campaign; Crowdfunding Ideas & Tips, which can display ideas for creating crowdfunding campaigns and tips on marketing crowdfunding campaigns, Crowdfunding Archives, which can display the user's expired and inactive crowdfunding campaigns; Contributors, which can display information regarding individual donors or entities who have contributed funds to the user's campaigns, such as names, contact information and historical monetary contributions; and Campaign Reports which can display information pertaining to the user's active and inactive crowdfunding campaigns, such as the name of campaign, the campaign beneficiaries, campaign commencement date, the campaign duration and expiration date, funding objective, progress reports, projections charts and graphs and a log detailing all donor or contributor information, such as the name of donor or contributor, date of contribution, time of contribution, amount of contribution and the money form of the contribution.

The My Homework utility can allow the user to manage their homework assignments and can further allow administrators as well as affiliates such as schools and teachers to assign homework that is related to personal finance, money, economics, and so forth.

The My Homework utility can include a variety of features and functions, including My Homework Assignments, which can display a log of the user's homework assignments, including pending assignments and new assignments; Calendar, which can display a monthly calendar showing the user's homework assignments receipt dates and due dates; Scheduler, which can allow the user to create and organize a schedule for homework assignments; Prioritizer, which can allow the user to organize and prioritize homework assignments in order of due dates; Time Manager, which can allow the user to efficiently manage time for homework assignments and display time logs showing the time taken for previous homework assignments; School Messages, showing a message log to the user from the school, Grade Tracker, showing the user's school grade history; Search Homework, allowing the user to search past assignments by keyword or date; and Homework Archives, showing a log of the user's past homework assignments.

The My Life Points utility can allow the user and the administrators to transact and manage a rewards payment program that can motivate the user to frequently engage with and use the various financial learning, entrepreneurship learning and life management utilities and programs of software 300 and apparatus 100.

Life Points are non-monetary reward points that can be earned, accumulated and converted to money by the user based on a pre-set conversion rate established by an administrator. The administrator can reward the user with Life Points for engaging with the educational and entertaining utilities, programs, games, exercises and resources, of software 300; for example, by trading with an investment demo account, managing a demo bank account, creating crowdfunding campaigns, starting a business, earning money through jobs, selling unwanted personal items, achieving savings goals, managing real bank accounts, trading stocks with real investment accounts, donating to charity, reading financial websites, playing financial games and so forth. The administrator can also use life points to reward the user for successfully completing chores, job and homework assignments. Software 300 can track and record all the user's usage activities and generate reports detailing the usage activities, for example access start times, access termination times, total usage duration and the nature of activities or actions the user engaged in, the utility programs utilized, the games played and the web resources accessed. The administrator can use the administrator interface to obtain the user's usage and activity information, to reward life points, to establish life points conversion rate and schedules, and so forth.

For the user, the Life Points utility can display a rewardable actions interface 800, shown in FIG. 8. The rewardable actions interface 800 can display to the user a list 802 of actions which are eligible for a life points reward or for which life points have been rewarded, including details such as the rewarder of the life points, the action for which the life points were rewarded, the completion date or due date of the action, and the amount of life points rewarded.

The My Website utility can allow the user to create and manage personal websites via the interfaces of software 300. The My Website utility can provide a variety of functions, including My Website Library, which can present links to the user's active websites, and display a list of the user's deactivated websites; Create & Launch Websites which can provide authoring tools and templates that allow the user to create and launch websites; and Website Idea Center which can provide to the user various ideas for creating websites.

The My Life Boards utility can allow the user to create and manage a collection of artistic pin boards, which can let the user collect various images, articles, and other content from software 300, from affiliates 214, and from the internet, and to clip the content to the life board. The My Life Boards utility can provide a variety of functions, including My Life Board Library, which can show the user's active life boards; My Life Board Ideas, which can provide the user various ideas for creating life boards; and Create & Launch, which can provide the user with authoring tools and templates for creating life boards.

The My Games utility can provide the user with a variety of educational and entertaining games related to personal finance, money management, business, entrepreneurship and life in general. The games may be played in single-player mode by the user, or may be played in cooperation or against other users of an apparatus 100 in a single household, or remote users of other apparatuses 100 that are registered with system 200. The My Games utility can provide a variety of game categories, including business-related games, finance-related games, life-related games, and money-related games.

The My Private Advisor utility can allow the user to consult with registered affiliates of system 200 who can offer professional advice related to a variety of topics. For example, the user can receive advice relating to topics such as money & finance, school matters, sports & health, starting a business, social matters, friends and family and life in general, and so forth. The advice may be provided in a discreet and anonymous manner. The My Private Advisor utility can present the user with various advisor categories, including General Advisor, Life Advisor, Money & Finance Advisor, School Advisor, Sports & Health Advisor, Business Advisor, Entertainment Advisor and Social Advisor. The user can select one of the categories and enter their query into a field. The query can then be sent to the selected advisor who can provide a response in due course.

The My Financial Resources utility can allow the user to create and organize libraries of educational and informative web resources related to personal finance, financial literacy and money in general. The My Financial Resources utility can provide several functions, including Next Resources, allowing the user to access and display successive groups of resource lists; The Create Library, allowing the user to create a resource libraries; Search Resources, allowing the user to access the web to search for personal financial, financial literacy and money resource websites, and to add desired resource websites to the library; Recommend Resources, allowing the user to automatically generate a list of recommended personal financial, financial literacy and money resource websites resources; and Press, allowing the user to access a variety of news and press content pertaining to personal financial, financial literacy and money resources.

The My Message Board utility can provide a central location for displaying communications to and from the user, and to view a log of all incoming and outgoing messages, including audio, video, and email, as well as messages within system 200, including messages between the user and administrators, between the user and affiliates, and between the user and other users. Messages related to affiliated banks, affiliated brokerage investment firms, prospective employers, affiliated retailers, Barter & Sales Exchange sellers, Barter & Sales Exchange buyers, fund contributors, friends, family members, parents, administrators, charities, community organizations, school teachers and other users may be shown in the My Message Board utility.

The My Chat Room utility can allow the user to create, manage, and visit chat rooms, forums and blogs for interacting with other users registered with system 200. The My Chat Room utility can include a list of available chat rooms and forums, as well as options to create and terminate chat rooms and forums, and to invite other users to the chat rooms and forums.

The My Money Facts utility can provide the user with a variety of information and facts pertaining to personal finance, financial literacy, and money in general. The My Money Facts utility can present to the user a variety of topics, for example, History of Money, United States Currency, World Currencies, Amazing Money, Fun Money Facts and Quote of the Day. The user can select a topic to view further information regarding to the topic.

The Life Share utility can allow the user to access and play a variety of educational multimedia materials that have been created and posted by affiliates such as educators, banks and investment brokerage firms. For example, such material can include video tutorials pertaining to personal finance and money, banking, the stock market, investing, entrepreneurship, and so forth. The user can select a desired educational material from a list provided by the Life Share Utility.

The Life Hub News and Press utility can display to the user information regarding apparatus 100, system 200, software 300, and so forth. Such information can include new and upcoming software programing releases, new services releases, new retail, bank and investment firm affiliates and upcoming events and schedules, as well as any other relevant information.

Software 300 can include a separate interface for administrators 204 that can allow the administrators to access administrator-only features and to set permissions for users 202. The administrators interface can include a variety of functions, including Parental Controls, User Accounts, Life Points, Chores & Allowance, Usage Log, Mobile, Checks & IOUs, Notifications & Alerts, Third Party Approvals and Messages.

The Parental Controls function can allow administrators to create and activate specific restrictions and filters for the user for blocking or filtering certain content, information and resources including web content, investment trading platforms and utility applications. The administrator can also establish online privacy settings for the user. Additionally, the Parental Controls function can include a monitoring utility that allows the administrator to monitor, in real time, the user's activities on apparatus 100 and on other devices, for example by accessing a website hosted on server 206 using another computing device or a mobile device.

The User Accounts function can allow administrators to access and display information regarding the accounts of users that are registered on apparatus 100, including account balances, deposit and withdrawal logs, account reports, gaming activities, jobs and chores activity logs, barter and sales activity logs, shopping activities, wish-list information, real and demo banking activities, real and demo trading and investment activities, message logs, web browser histories and other information and data. The User Accounts function can also allow administrators to create a universal access password that can allow administrators to access administrator functions from any interface of software 300.

The Life Points function can allow administrators to create, register and manage actions that are rewardable with life points, as well as schedules and conversion rates. The Chores & Allowance function can allow administrators to create, register and manage chore assignments and allowance schedules for users. The Usage Log function can allow administrators to access and display usage logs for each user of apparatus 100. The Checks & IOUs function can allow administrators to create, register and manage a log of checks and IOUs so as to record and save information pertaining to users' checks and IOUs. The Notifications & Alerts function can allow administrators institute and manage mobile and email notifications and alerts, as well as rules for issuing notifications and alerts, based on desired activity in a user's account. The Third Party Approvals function can allow administrators to approve user communications with affiliates 214 of system 200, including affiliated banks, affiliated investment brokerage firms, affiliated retailers and prospective employers. The Mobile function can allow administrators to determine which users can connect to system 200 via a mobile device. The Messages function can allow administrators to create and manage a message board and to send to and receive messages from users.

Software 300 can further provide age-appropriate programming to users 202 of apparatus 100. Users may be required to provide their age when registering an account with apparatus 100. Based on the age of the user, software 300 can vary the selection of features available to the user. For example, for users aged between three and six, software 300 can block access to more complex financial tools and utilities, and display simple content, allowing the younger user to interact with apparatus 100 in a limited scope. Actions such as depositing coins can trigger entertaining age appropriate animations on the screen display. As the user becomes older, software 300 can increase the user's access to additional utility applications.

Additionally, software 300 can include a variety of multimedia programming and content, such as sounds, animations, videos and so forth. The multimedia content can be provided to users of software 300 at any desired point or as a result of any desired interaction. For example, multimedia content can be shown to welcome users upon log in, upon selection of a particular utility application, upon completing an activity such as depositing or withdrawing money, or upon reaching a desired savings goal. Additionally, frequency and content of the multimedia may differ based on the age of the user, with younger users receiving simpler and more frequent content than older users. The multimedia content may be stored on the storage medium 138 of apparatus 100 or may be streamed or downloaded from server 206 of system 200. Additionally, users can register with system 200 to receive additional multimedia content as desired.

Software 300 can include a library of multimedia content that can be integrated into various aspects of software 300 and utilized so as to provide an engaging and age-appropriate experience to the user. For example, for younger users, the multimedia content can engage the younger user's imagination so as to motivate the user to use apparatus 100 and learn personal finance, form positive money habits and learn important life skills.

The multimedia content can be provided to greet, encourage and congratulate the user for a variety of reasons, for example, special occasions, achievements, and milestones, as well as any other desired user interaction with software 300. As examples, cartoons and animations could greet, congratulate and/or rally the user after accessing their account on the Home screen. For example, multimedia content such as cartoons and animations could be displayed to the user for a variety of achievements, such as saving a sufficient amount of money to purchase desired pre-registered product or service, donating money to a charity, attaining pre-set savings goals, selling personal items, winning financial games, starting a new business, achieving specific school grade scores, and so forth. The multimedia content can include licensed well-known characters, or characters proprietary to the financial education, entrepreneurship education and life management system 200.

Thus, the embodiments described herein can allow users to learn about finance, fiscal responsibility, and entrepreneurship, as well as to manage many aspects of their lives simply via one stand-alone apparatus.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. An apparatus for financial education, entrepreneurship education, and life management, comprising:
   a housing;
   at least two storage compartments received within the housing, each of the at least two storage compartments corresponding to a separate user account for each of two or more different users, and including an interior cavity;
   a coin acceptor assembly adapted to receive a coin, determine the denomination of the coin, and deposit the coin into a desired compartment of the at least two compartments;
   electronic circuitry communicatively coupled to the coin acceptor assembly;
   a display device communicatively coupled to the electronic circuitry;
   at least one input device communicatively coupled to the electronic circuitry;
   wherein the electronic circuitry includes at least one non-transitory computer-readable medium storing executable instructions and a processor adapted to execute the instructions;
   wherein the instructions are adapted to display a graphic interface on the display device, and to receive input from a user via the at least one input device, so as to allow the user to manage a user account, the user account including a monetary balance;
   wherein the instructions are further adapted to cause the coin acceptor assembly to direct coins to the compartment corresponding to a user account of a user engaging the apparatus.

2. The apparatus of claim 1, wherein the instructions are further adapted to receive coin denomination data from the coin acceptor assembly, and to update the monetary balance of the user based on the coin denomination data.

3. The apparatus of claim 1, further comprising:
   an image capture device communicatively coupled to the electronic circuitry;
   wherein the instructions are further adapted to receive an image from the image capture device, determine if the image is an image of currency, and determine the denomination of the currency.

4. The apparatus of claim 1, further comprising a base coupled to the housing, wherein the electronic circuitry is disposed within the base.

5. The apparatus of claim 1, wherein the housing is shaped as a cylinder.

6. The apparatus of claim 1, wherein the housing is shaped as a triangular prism.

7. The apparatus of claim 1, wherein the executable instructions are provided as software comprising a plurality of utility applications.

8. The apparatus of claim 7, wherein the utility applications include a deposit utility and a withdrawal utility.

9. The apparatus of claim 8, wherein the utility applications further include one or more of an account utility, a banking utility, an investments utility, a shopping utility, a chores utility, a jobs utility, a barter and sale exchange utility, a financial planner utility, a business world utility, a crowdfunding utility, a homework utility, a life points utility, a website utility, a life boards utility, a games utility, a private advisor utility, a financial resources utility, a message board utility, a chat room utility, a money facts utility, a life share utility and a news and press utility.

10. A system for financial education, entrepreneurship education, and life management, comprising:
    a server;
    a plurality of financial education apparatuses in communication with the server;
    at least two users associated with each financial education apparatus and registered with the server;
    at least one administrator associated with each financial education apparatus and registered with the server;
    a plurality of affiliates registered with the server;
    wherein each financial education apparatus comprises a housing, at least two storage compartments corresponding to separate user accounts for each of the at least two users received within the housing and including an interior cavity, a coin acceptor assembly adapted to receive a coin, determine the denomination of the coin, and deposit the coin into the storage compartment, electronic circuitry communicatively coupled to the coin acceptor assembly, a display device communicatively coupled to the electronic circuitry, at least one input device communicatively coupled to the electronic circuitry, wherein the electronic circuitry includes at least one non-transitory computer-readable medium storing software and a processor adapted to execute the software, wherein the software is adapted to display a graphic interface on the display device, and to receive input from one of the at least two users via the at least one input device, so as to allow the one of the at least two users to manage a user account, the user account including a monetary balance;
    wherein the software comprises a plurality of utility applications including a deposit utility, a withdrawal utility, a jobs utility, a barter and sale exchange utility, a crowdfunding utility, and an investments utility.

11. The system of claim 10, wherein the affiliates include one or more of financial institutions, retail establishments, prospective employers, advisors, consultants and educational institutions.

12. The system of claim 10, wherein the software is adapted to facilitate communications between a user and an affiliate.

13. The system of claim 12, wherein the communications include one or more of educational communications, financial management communications, investment communications, employment communications, retail communications and advising communications.

14. The system of claim 12, wherein the communications include data-induced communications.

15. The apparatus of claim 10, wherein the utility applications further include one or more of an account utility, a banking utility, a shopping utility, a chores utility, a financial planner utility, a business world utility, a homework utility, a life points utility, a website utility, a life boards utility, a games utility, a private advisor utility, a financial resources utility, a message board utility, a chat room utility, a money facts utility, a life share utility and a news and press utility.

16. The apparatus of claim 1, wherein each of the at least two storage compartments is constructed from a different color of translucent plastic.

* * * * *